US012518675B2

(12) United States Patent
Xi et al.

(10) Patent No.: US 12,518,675 B2
(45) Date of Patent: Jan. 6, 2026

(54) METHODS, APPARATUS, AND ARTICLES OF MANUFACTURE TO CONTROL A MICRO-LED DISPLAY

(71) Applicant: Intel Corporation, Santa Clara, CA (US)

(72) Inventors: Peng-Bo Xi, New Taipei (TW); Yi-Chuan Liu, Zhubei (TW); Jackson Tsai, New Taipei (TW)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 17/711,992

(22) Filed: Apr. 1, 2022

(65) Prior Publication Data
US 2022/0223103 A1 Jul. 14, 2022

(51) Int. Cl.
*G09G 3/32* (2016.01)
(52) U.S. Cl.
CPC ........ *G09G 3/32* (2013.01); *G09G 2310/0267* (2013.01); *G09G 2310/0272* (2013.01); *G09G 2310/0297* (2013.01); *G09G 2320/064* (2013.01)
(58) Field of Classification Search
CPC ............. G09G 3/32; G09G 2310/0267; G09G 2310/0272; G09G 2310/0297; G09G 2320/064; G09G 3/2022; G09G 2300/0857; G09G 3/2014
See application file for complete search history.

(56) References Cited

U.S. PATENT DOCUMENTS

| | | |
|---|---|---|
| 10,026,721 B2 | 7/2018 | Kim et al. |
| 10,770,440 B2 | 9/2020 | England et al. |
| 11,574,585 B1 | 2/2023 | Su |
| 2015/0332635 A1* | 11/2015 | Lau ............... G09G 3/3266 345/83 |
| 2018/0197471 A1* | 7/2018 | Rotzoll .............. G09G 3/2003 |
| 2021/0391381 A1 | 12/2021 | Asada |
| 2022/0165619 A1 | 5/2022 | Hotta |
| 2022/0223102 A1 | 7/2022 | Xi et al. |

(Continued)

FOREIGN PATENT DOCUMENTS

CN 110287808 A 9/2019

OTHER PUBLICATIONS

Madden et al., "Advancing High Performance Heterogeneous Integration Through Die Stacking," 2012 Proceedings of the ESSCIRC, Sep. 17-21, 2012, 7 pages.

(Continued)

*Primary Examiner* — Premal R Patel
(74) *Attorney, Agent, or Firm* — Hanley, Flight & Zimmerman, LLC

(57) ABSTRACT

Methods, apparatus, and articles of manufacture to control a micro-LED display are disclosed. An example apparatus for a micro-LED display, the apparatus includes a micro-LED matrix, a first driver circuit electrically coupled to micro-LEDs of the micro-LED matrix, a second driver circuit electrically coupled to the first driver circuit, the second driver circuit to provide at least (a) a scan signal and (b) a pulse width modulation (PWM) signal to the first driver circuit, the first driver circuit to drive the micro-LEDs based on the scan signal and the PWM signal.

24 Claims, 22 Drawing Sheets

(56) References Cited

U.S. PATENT DOCUMENTS

2023/0215342 A1* 7/2023 Boecker ............... H01L 25/162
                                                    345/691

OTHER PUBLICATIONS

United States Patent and Trademark Office, "Requirement for Restriction/Election," issued in connection with U.S. Appl. No. 17/710,098, dated Jul. 5, 2024, 7 pages.
United States Patent and Trademark Office, "Non-Final Office Action," issued in connection with U.S. Appl. No. 17/710,098, dated Sep. 6, 2024, 12 pages.
United States Patent and Trademark Office, "Final Office Action," issued in connection with U.S. Appl. No. 17/710,098, dated Jan. 29, 2025, 16 pages.
United States Patent and Trademark Office, "Notice of Allowance and Fee(s) Due," issued in connection with U.S. Appl. No. 17/710,098, dated Apr. 2, 2025, 9 pages.

* cited by examiner

METHODS, APPARATUS, AND ARTICLES OF MANUFACTURE TO CONTROL A MICRO-LED DISPLAY

FIELD OF THE DISCLOSURE

This disclosure relates generally to micro-light emitting diodes (micro-LEDs) and, more particularly, to methods, apparatus, and articles of manufacture to control a micro-LED display.

BACKGROUND

In recent years, micro-light emitting diode (micro-LED) display technology has been the focus of considerable research and development. Among other advantages, micro-LED displays show promise of consuming three to five times less power than organic LED (OLED) displays.

Figure 1:
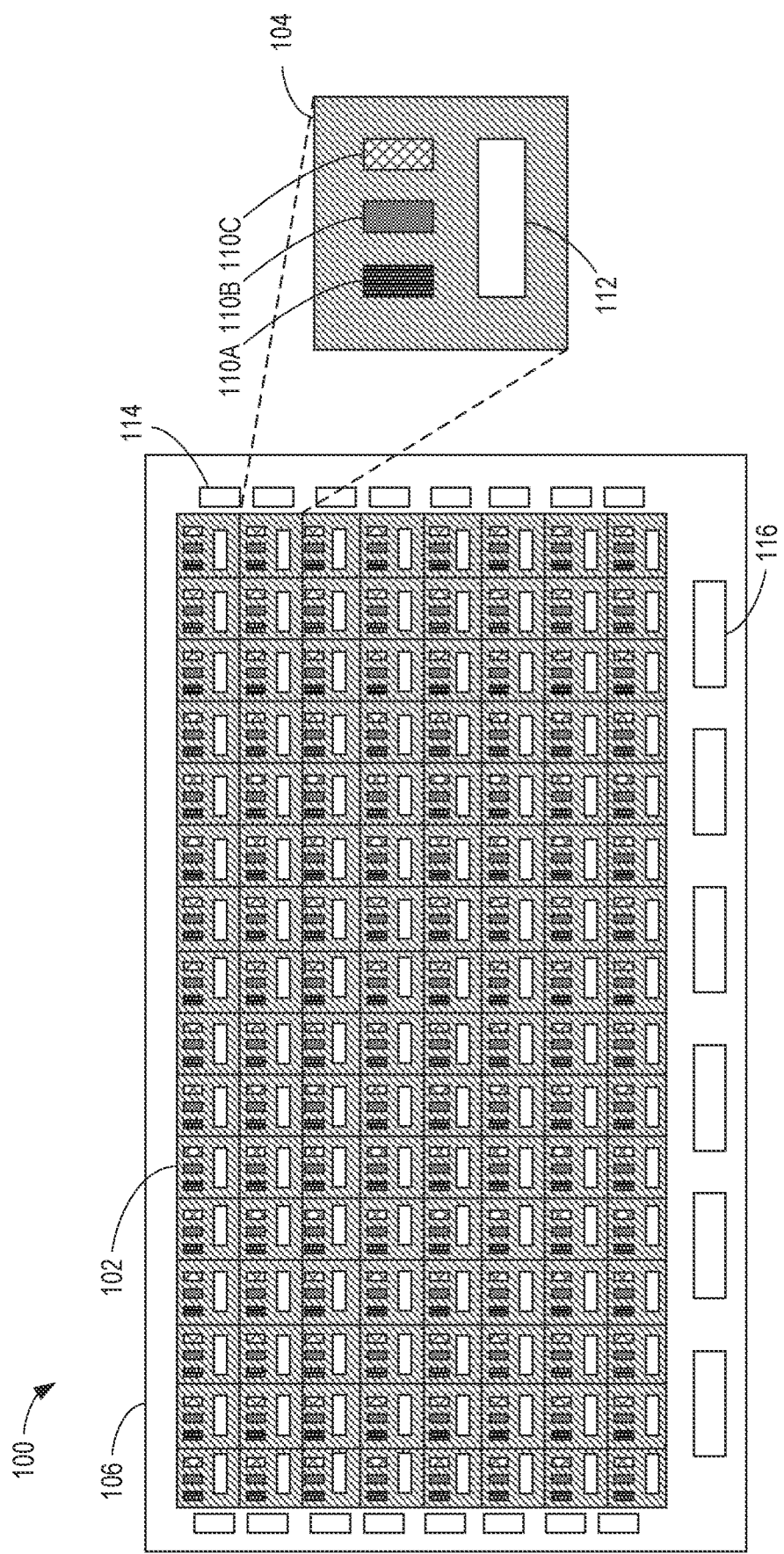
FIG. 1 illustrates a micro-LED display including an array of first micro-LED pixel devices.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Micro-LED displays produce light in response to current flowing through individual micro-LEDs of the display. Micro-LEDs include inorganic structures with typical "on" voltage drops ranging from 1.9 volts (V) to 3 V depending on a color displayed. In some instances, micro-LEDs are arranged in a two-dimensional array (e.g., matrix) of elements to provide a display. Unlike organic LEDs (OLEDs) that utilize organic compounds, micro-LEDs utilize inorganic compounds (e.g., gallium nitride) that illuminate when supplied with current.

As used herein, the term "micro-LED" is not limited to a specific LED dimension. However, in some examples, the micro-LEDs have a dimension (e.g., a length and/or a width) that is less than 100 micrometers. For example, a size of the micro-LEDs can be less than or equal to 100 micrometers by 100 micrometers. In some examples, the size of the micro-LEDs can be less than or equal to 30 micrometers by 30 micrometers.

Active-matrix micro-LED displays provide high-resolution color graphics with a high refresh rate. In some examples, the display includes at least N×M pixel devices in a matrix having N rows and M columns, including at least one of the N×M pixel devices positioned at each matrix junction where a row intersects a column. Each of the N×M pixel devices includes one or more LEDs and a pixel driver circuit to control the one or more LEDs. In some examples, each of the N×M pixel devices corresponds to an individual element (e.g., a pixel) on a substrate of the display.

Typically, at least one row driver and at least one column driver are used to control individual ones of the pixel devices located at the matrix junctions. For example, the column drivers drive the columns (connected to device anodes) and the row drivers drive the rows (connected to device cathodes). In some examples, the row drivers sequentially scan the rows with a driver switch to a first voltage such as a ground. In operation, information is transferred to the display by scanning each row in sequence. During each row scan period, the column drivers also drive each column in the current row that is connected to an element intended to emit light.

Typical pixel devices conduct current and luminesce (e.g., emit light) when voltage of one polarity is imposed across the pixel devices, and block current when voltage of an opposite polarity is applied. To produce the perception of a grayscale or a full-color image using a micro-LED display at optimal power efficiency, it is necessary to rapidly modulate micro-LEDs of pixel devices of the display between on and off states such that the average of their modulated brightness waveforms correspond to a desired 'analog' brightness for each pixel. This technique is generally referred to as pulse-width modulation (PWM). Above a particular modulation frequency, the human eye and brain integrate a pixel's rapidly varying brightness (and color, in a field-sequential color display) and perceive a brightness (and color) determined by the pixel's average illumination over a period of time (e.g., over a display of a video frame).

PWM operation of micro-LEDs provides improvements in power efficiency when compared to analog driving. However, driving micro-LEDs using pulses of a PWM signal sent from column drivers across display lengths can cause undesired high power consumption and pulse distortion. To address some drawbacks of PWM signals, some micro-LED devices include PWM circuits to control each pixel device. Such PWM circuits may be implemented in a silicon (Si) complementary metal-oxide-semiconductor (CMOS) and transferred to a backplane on the same surface as the micro-LEDs. While this technique may work for large displays including large pixels (e.g., televisions), as pixel size decreases, such techniques become infeasible to make small enough for products such as laptops and smartphones due to a transistor count of the circuits when implemented with thin-film transistor (TFT) technology. Furthermore, by implementing the PWM circuits on the same surface as the micro-LEDs, micro-LED devices limit a resolution of a micro-LED display by limiting pixel pitch reduction of the micro-LED display. In particular, the surfaces of the micro-LED devices are sized to accommodate at least the micro-LEDs and the corresponding PWM circuits thereupon, such that a distance between adjacent pixels (e.g., the pixel pitch) is unable to be reduced less than a threshold distance. Additionally, by requiring a large number of the PWM circuits (e.g., one of the PWM circuits per pixel), micro-LED devices have high manufacturing complexity and parts costs.

In examples disclosed herein, "pixels" refer to discrete controllable elements of a micro-LED display, where each pixel includes a corresponding cluster of micro-LEDs (e.g., a red micro-LED, a green micro-LED, and a blue micro-LED). In examples disclosed herein, "pixel pitch" refers to the distance between adjacent pixels in a micro-LED display. In examples disclosed herein, a pixel density and/or resolution of the micro-LED display increases when the pixel pitch decreases, and the pixel density and/or the resolution decreases when the pixel pitch increases.

Examples disclosed herein enable a reduction in pixel pitch (e.g., an increase in pixel density) of a micro-LED display by providing a micro-LED array (e.g., matrix) of micro-LEDs on a first side of a substrate (e.g., a polyimide substrate) and corresponding drivers (e.g., matrix driver circuits and/or assist driver circuits) on a second side of the substrate opposite the first side. In examples disclosed herein, conductive paths in the substrate electrically couple the micro-LEDs of the micro-LED array to the corresponding drivers. In some examples, each of the matrix driver circuits is to control multiple ones of the micro-LEDs. In examples disclosed herein, the assist driver circuits generate gray level bit data and current data based on an image to be displayed on the micro-LED display, and provide the gray level bit data and the current data to the matrix driver circuits. In some examples, the matrix driver circuits control a current flow to the corresponding micro-LEDs based on the gray level bit data and the current data. For example, the matrix driver circuits scan and/or otherwise read each bit of the gray level bit data using one or more shifted scan signals from the assist driver circuits. In response to a selected bit having a first binary value (e.g., 1), the matrix driver circuit enables a bit pulse source signal associated with the selected bit, where the bit pulse source signal is contained in one or more PWM signals obtained from the assist driver circuits. In some examples, the current flow and, thus, a brightness of the corresponding micro-LEDs is based on a pulse width of the bit pulse source signal.

Advantageously, by enabling each of the matrix driver circuits to control multiple micro-LEDs, examples disclosed herein reduce a number of drivers to be implemented in a micro-LED display, thus reducing parts costs for the display and/or power consumption of the display. Additionally, examples disclosed herein enable an increase in pixels per inch (PPI) of the display by reducing the pitch between the individual pixels, thus improving a resolution of the display.

FIG. 1 illustrates a micro-LED display 100 including a micro-LED array 102 of pixel devices 104. In some examples, the micro-LED display 100 can be implemented on, or as a part of, an electronic device such as a laptop, a tablet, a smartphone, a smartwatch, a television, a computer monitor, etc. In FIG. 1, the pixel devices 104 (one of which is enlarged and referenced in FIG. 1) are arranged in a two-dimensional matrix on a panel 106 of the micro-LED display 100. Each of the pixel devices 104 corresponds to an individual pixel of the micro-LED display 100. While reference is made to one of the pixel devices 104, description and/or illustration associated with the one of the pixel devices 104 can be considered to apply equally to each of the pixel devices 104 in FIG. 1.

Each of the pixel devices 104 includes one or more micro-LEDs 110. The pixel device 104 includes a first micro-LED 110A, a second micro-LED 110B, and a third micro-LED 110C on a surface of the pixel device 104. In some instances, the micro-LEDs 110 correspond to different colored lights. In FIG. 1, the first, second, and third micro-LEDs 110A, 110B, 110C correspond to red, green, and blue colored lights, respectively. In FIG. 1, each of the pixel devices 104 further includes a pixel driver circuit (e.g., an integrated circuit (IC), a control circuit) 112 on the surface of the pixel devices 104. In some examples, the pixel driver circuit 112 is electrically coupled to each of the micro-LEDs 110 of the corresponding pixel device 104 to control operation thereof. For example, the pixel driver circuit 112 can control a signal (e.g., a current) provided to ones of the micro-LEDs 110, where the signal can be used to turn on the ones of the micro-LEDs 110 and/or vary a brightness thereof.

In the illustrated example of FIG. 1, the micro-LED display 100 includes row drivers (e.g., row driver circuits) 114 and column drivers (e.g., column driver circuits) 116 on the panel 106 outside of the micro-LED array 102. In some examples, the pixel driver circuits 112 are driven by the column drivers 116 and the row drivers 114. For example, the column drivers 116 supply a low frequency signal (e.g., a sawtooth wave signal, a triangular/triangle wave signal, etc.) while the row drivers 114 supply a scan signal to selectively pass a data signal representative of an image to be displayed to activate the pixel devices 104 of a particular row of the micro-LED display 100. For example, the data signal may be supplied to the micro-LED display 100 from a digital-to-analog converter (DAC) to drive the micro-LED display 100 to display an image initially represented in digital data. The pixel driver circuits 112 convert the low frequency signal into a higher frequency PWM signal having a pulse that is based on a DC voltage of the input data signal. According to the illustrated example, the amplitude of the PWM signal is fixed at a level that drives the micro-LEDs 110 at efficient operating current. In some instances, the brightness and/or color of the micro-LEDs 110 is controlled by the pulse width of the PWM signal. While eight of the row drivers 114 and five of the column drivers 116 are shown in FIG. 1, a different number of the row drivers 114 and/or the column drivers 116 may be used instead.

Figure 2A:
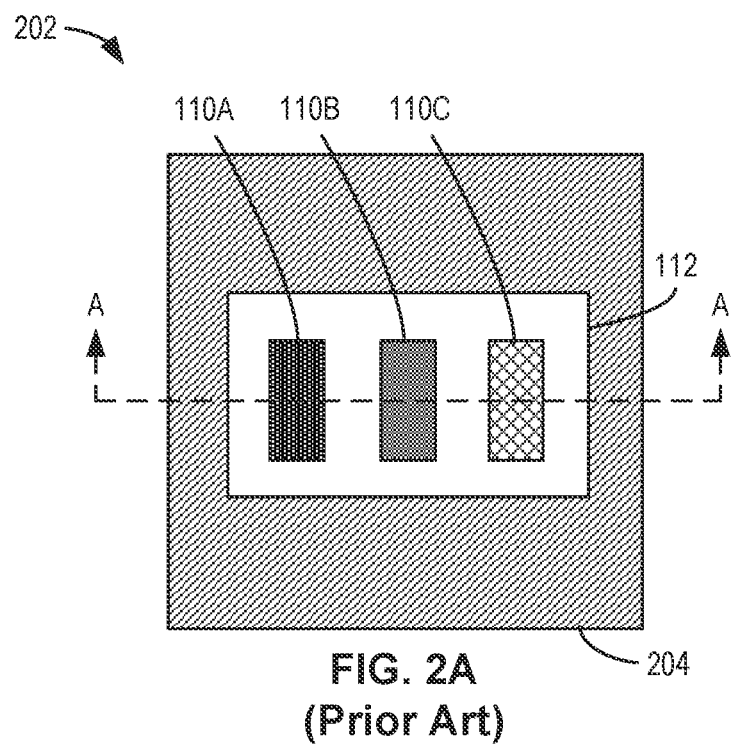
FIG. 2A is a top view of a second micro-LED pixel device.
Figure 2B:
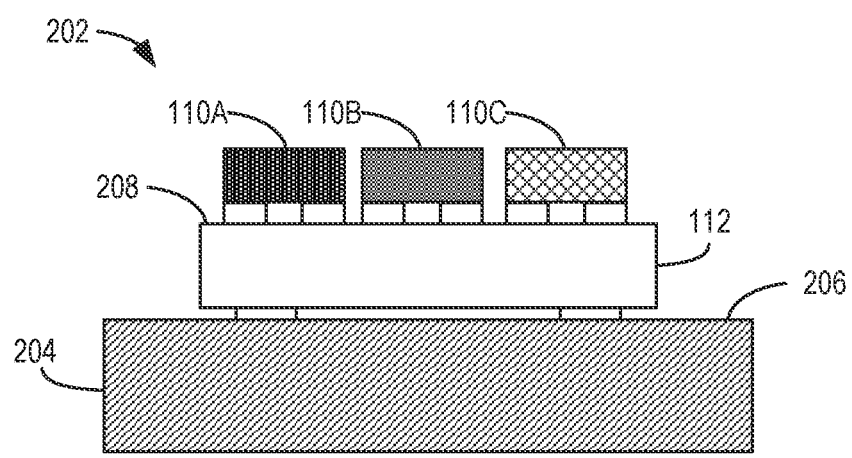
FIG. 2B is a cross-sectional view of the second micro-LED pixel device taken along line A-A of FIG. 2A.

FIG. 2A illustrates a top view of a second pixel device 202 that can be implemented in the micro-LED display 100 of FIG. 1. Furthermore, FIG. 2B illustrates a cross-sectional view of the second pixel device 202 taken along line A-A of FIG. 2A. In some examples, the second pixel device 202 may be implemented in the micro-LED array 102 of FIG. 1 instead of one or more of the pixel devices 104 of FIG. 1. In FIGS. 2A and 2B, the micro-LEDS 110 (e.g., including the first micro-LED 110A, the second micro-LED 110B, and the third micro-LED 110C), the pixel driver circuit 112, and a substrate 204 of the second pixel device 202 are in a stacked arrangement. In particular, as shown in FIG. 2B, the pixel driver circuit 112 is coupled to a first surface 206 of the substrate 204, and the micro-LEDs 110 are coupled to a surface 208 of the pixel driver circuit 112.

In some instances, by arranging the micro-LEDs 110, the pixel driver circuit 112, and the substrate 204 of the second pixel device 202 in a stack as shown in FIGS. 2A and/or 2B, a surface area of the second pixel device 202 may be reduced compared to a corresponding surface area of the pixel device 104 of FIG. 1. In some examples, the surface area of the second pixel device 202 is greater than or equal to a surface area of the surface 208 of the pixel driver circuit 112. As such, a resolution of the micro-LED display 100 of FIG. 1 may be increased by implementing the second pixel device 202 of FIGS. 2A and/or 2B instead of the pixel device 104 of FIG. 1. However, a size of the second pixel device 202 may not be reduced to less than a size of the pixel driver circuit 112, thus limiting the resolution of the micro-LED display 100. Furthermore, each of the pixel devices 104 of FIG. 1 and/or the second pixel device 202 of FIGS. 2A and/or 2B implements a respective one of the pixel driver circuits 112 thereon. As such, for an N×M matrix of the pixel devices 104 of FIG. 1 and/or the second pixel devices 202 of FIGS. 2A and/or 2B, the micro-LED display 100 requires a corresponding N×M number of the pixel driver circuits 112.

Figure 3A:
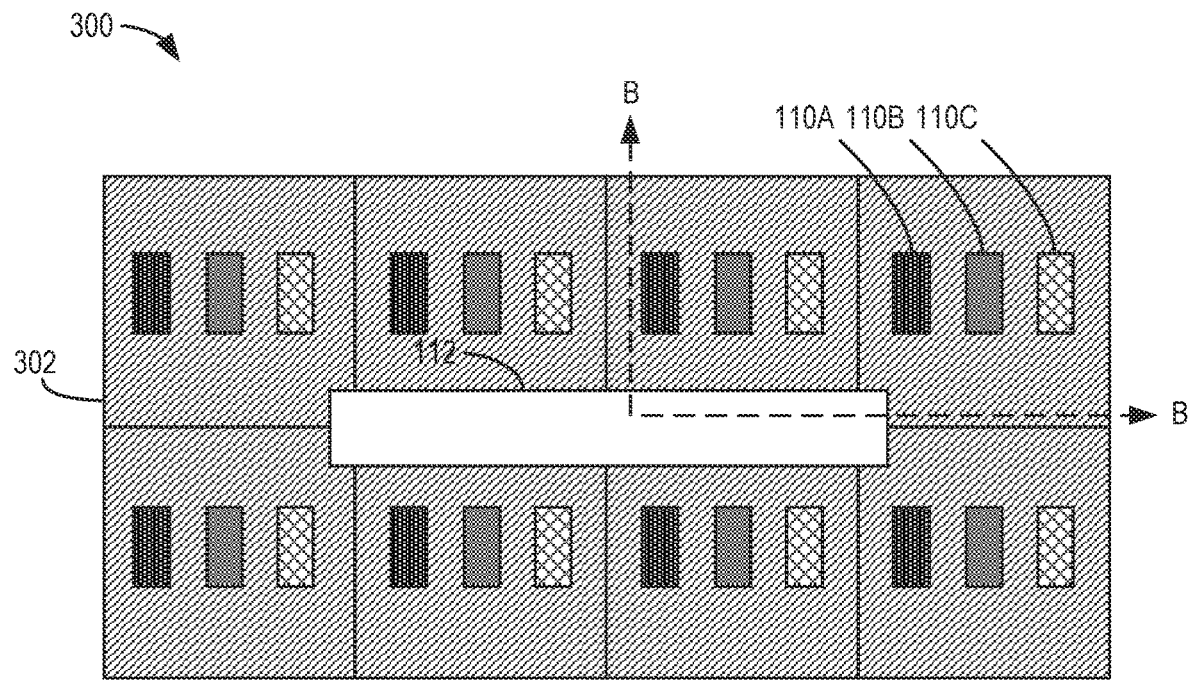
FIG. 3A is a top view of a micro-LED assembly.
Figure 3B:
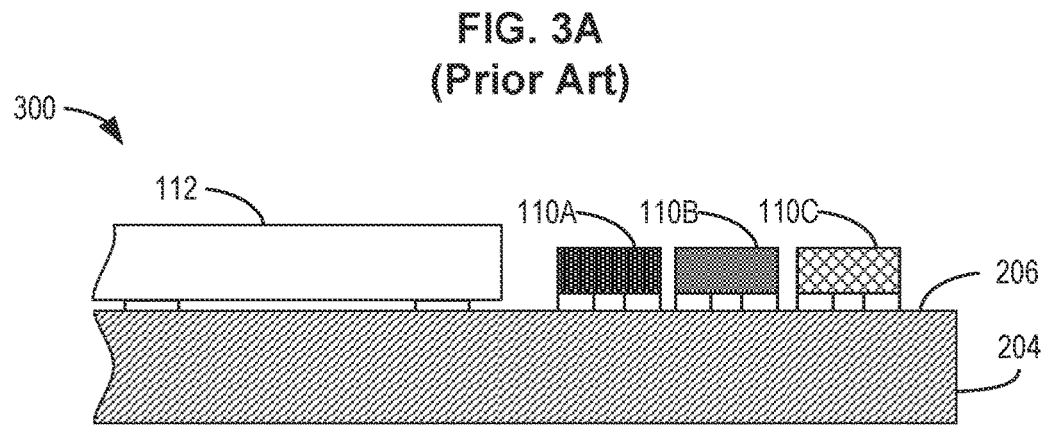
FIG. 3B is a cross-sectional view of the micro-LED assembly taken along line B-B of FIG. 3A.

FIG. 3A illustrates a top view of a micro-LED assembly 300 that may be implemented in the micro-LED display 100 of FIG. 1. Furthermore, FIG. 3B illustrates a cross-sectional view of the micro-LED assembly 300 taken along line B-B of FIG. 3A. In some examples, multiple ones of the micro-LED assembly 300 may be implemented in the micro-LED display 100 in addition to or instead of the pixel devices 104 of FIG. 1 and/or the second pixel devices 202 of FIGS. 2A and/or 2B. In FIG. 3A, the micro-LED assembly 300 includes third pixel devices 302 arranged in an n×m sub-matrix, where the n is less than N total number of rows and m is less than M total number of columns in the micro-LED display 100. In FIG. 3A, micro-LED assembly 300 includes 2 rows (e.g., n=2) and 4 columns (e.g., m=4) of the third pixel devices 302. In other examples, a size of the sub-matrix 300 may be different.

Each of the third pixel devices 302 includes the micro-LEDs 110 (e.g., including the first micro-LED 110A, the second micro-LED 110B, and the third micro-LED 110C). In this example, the pixel driver circuit 112 is coupled to a top surface of the micro-LED assembly 300 and electrically and/or operatively coupled to the micro-LEDs 110 of the third pixel devices 302 of the n×m sub-matrix. In particular, instead of each of the third pixel devices 302 including a corresponding one of the pixel driver circuits 112, the pixel driver circuit 112 of FIG. 3A controls multiple ones of the third pixel devices 302. As such, a number of the pixel driver circuits 112 in the micro-LED display 100 is reduced by implementing the micro-LED assembly 300 instead of the pixel devices 104 of FIG. 1 and/or the second pixel devices 202 of FIGS. 2A and/or 2B.

Turning to FIG. 3B, the side view of the micro-LED assembly 300 illustrates the pixel driver circuit 112 and the micro-LEDs 110 coupled to the first surface 206 of the substrate 204. The micro-LED assembly 300 is sized to accommodate at least the pixel driver circuit 112 and the micro-LEDs 110 of the third pixel devices 302. Reducing the number of the pixel driver circuits 112 enables a reduction in pixel pitch of the micro-LED display 100. However, since the pixel driver circuit 112 of FIG. 3B is implemented on the same surface is the micro-LEDs 110, the pixel pitch is unable to be reduced to less than a threshold pitch.

Figure 4:
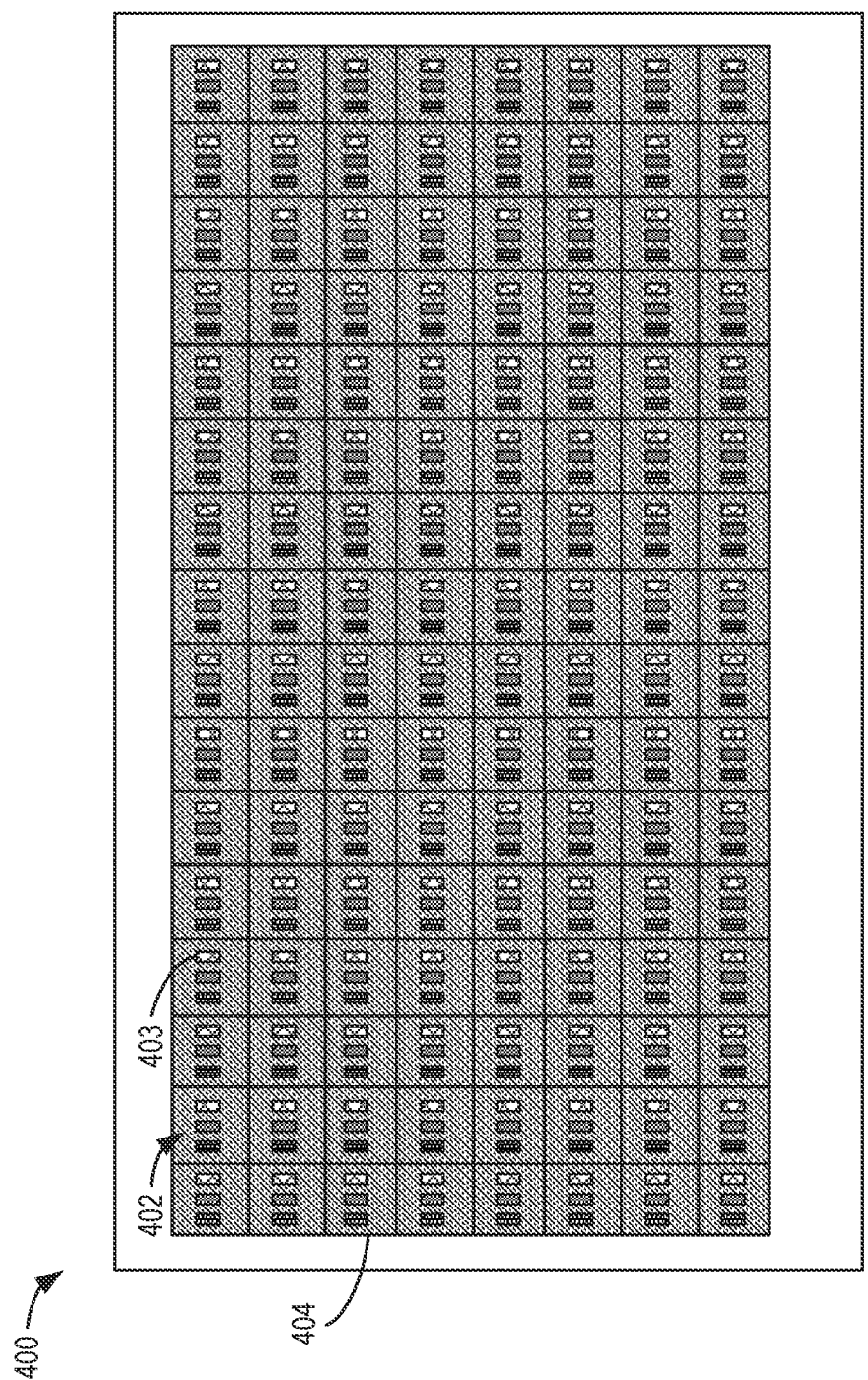
FIG. 4 is a top view of an example micro-LED display constructed in accordance with teachings of this disclosure.

FIG. 4 illustrates a top view of an example micro-LED display 400 constructed in accordance with teachings of this disclosure. In the illustrated example of FIG. 4, the micro-LED display 400 includes an example micro-LED matrix 402 of example micro-LEDs 403. In this example, the micro-LED display 400 includes example pixel devices 404 arranged in an N×M matrix of N rows and M columns. In some examples, like the pixel devices 104 of FIG. 1, the second pixel devices 202 of FIGS. 2A and/or 2B, and/or the third pixel devices 302 of FIGS. 3A and/or 3B, each of the pixel devices 404 of FIG. 4 corresponds to an individual pixel of the micro-LED display 400. In some examples, each of the pixel devices 404 includes three of the micro-LEDs 403 (e.g., a first example micro-LED 403A, a second example micro-LED 403B, and a third example micro-LED 403C) of the micro-LED matrix 402. In contrast to the pixel devices 104 of FIG. 1, the second pixel devices 202 of FIGS. 2A and/or 2B, and/or the third pixel devices 302 of FIGS. 3A and/or 3B, the pixel devices 404 do not include the pixel driver circuit(s) 112 on a top surface of the micro-LED display 400. While 8 rows and 16 columns of the pixel devices 404 are shown in FIG. 4, a different number of the rows and/or columns may be used instead.

Figure 5:
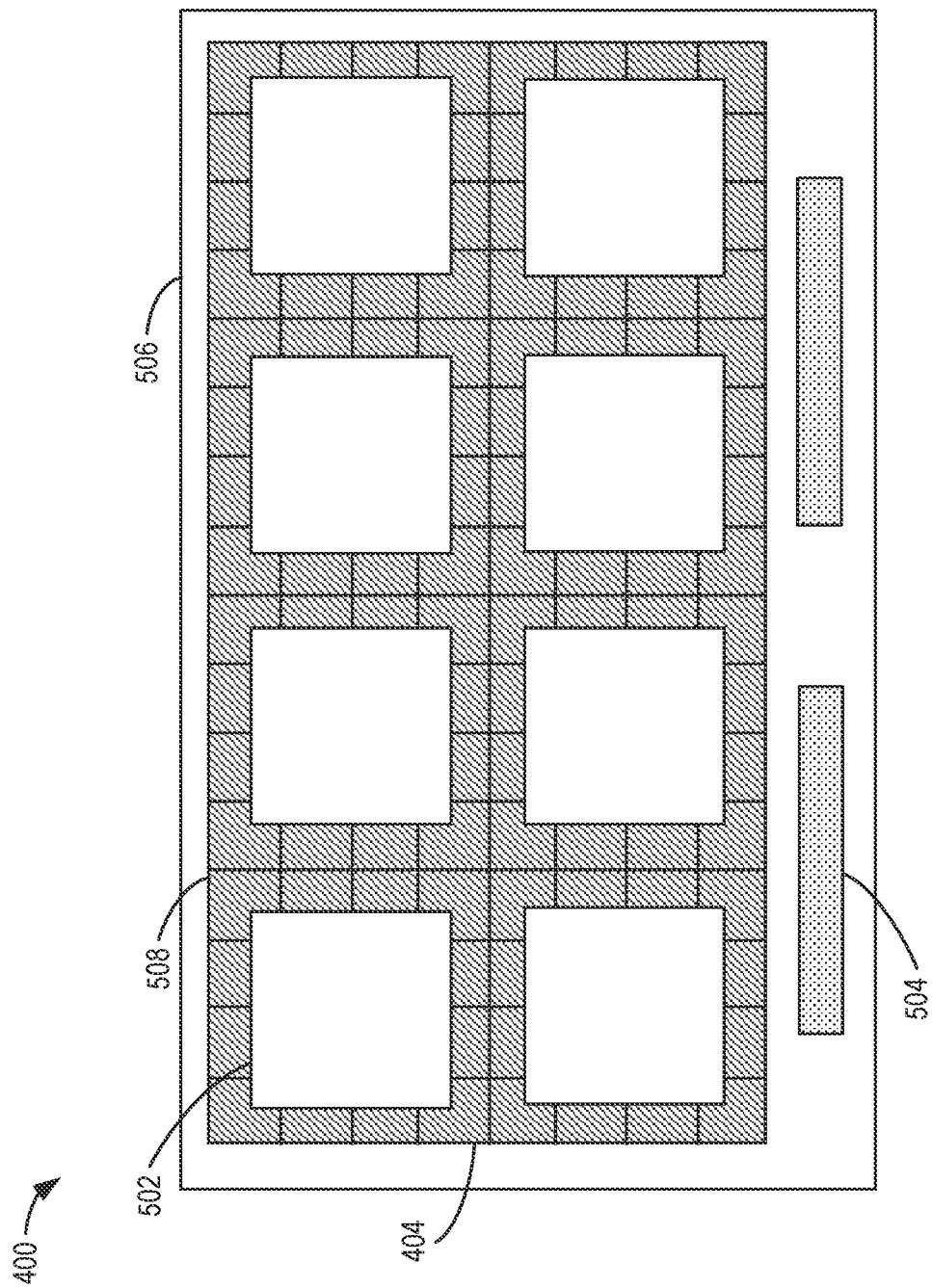
FIG. 5 is a bottom view of the example micro-LED display of FIG. 4.

FIG. 5 illustrates a bottom view of the example micro-LED display 400 of FIG. 4. In the illustrated example of FIG. 5, the micro-LED display 400 includes example matrix driver circuits (e.g., scan/active (S/A) pixel matrix driver circuits) 502, where each of the matrix driver circuits 502 controls corresponding ones of the pixel devices 404. For example, each of the matrix driver circuits 502 controls an n×m sub-matrix of the pixel devices 404, where n is less than or equal to a total number of rows (e.g., N) of the pixel devices 404, and m is less than or equal to a total number of columns (e.g., M) of the pixel devices 404. In the illustrated example of FIG. 5, each of the matrix driver circuits 502 controls sixteen of the pixel devices 404 (e.g., a corresponding 4×4 submatrix of the pixel devices 404). In other examples, the matrix driver circuits 502 can control a different number of the pixel devices 404 (e.g., 100, 1,000, etc.). In particular, each of the matrix driver circuits 502 can control up to 100,000 of the pixel devices 404. In this example, a size of one of the matrix driver circuits 502 is greater than a size of one of the pixel devices 404 (e.g., more than twice the size of the one of the pixel devices 404). As such, a number of the matrix driver circuits 502 implemented in the micro-LED display 400 is less than a number of the pixel devices 404.

In the illustrated example of FIG. 5, the micro-LED display 400 includes one or more example assist driver circuits (e.g., PWM/amplitude (P/A) data driver circuits) 504 coupled to an example panel 506 outside of an example active area 508 of the micro-LED display 400. In some examples, the assist driver circuits 504 are electrically coupled to corresponding ones of the matrix driver circuits 502. For example, each of the assist driver circuits 504 is electrically coupled to one or more corresponding columns of the matrix driver circuits 502. While two of the assist driver circuits 504 and eight of the matrix driver circuits 502 are shown in FIG. 5, a different number of the assist driver circuits 504 and/or the matrix driver circuits 502 may be used instead. In examples disclosed herein, a combination of the assist driver circuits 504 and the corresponding matrix driver circuits 502 is used to control operation of the micro-LED display 400. For example, instead of using the row drivers 114, the column drivers 116, and the pixel driver circuits 112 of FIG. 1 to control operation of the micro-LEDs 403, the assist driver circuits 504 and the matrix driver circuits 502 of FIG. 5 control individual ones of the micro-LEDs 403 to display an image on the micro-LED display 400. In particular, each of the matrix driver circuits 502 can control multiple rows and/or columns of the pixel devices 404, such that the micro-LED display 400 does not require separate drivers to control the individual rows and columns of the pixel devices 404.

Figure 6:
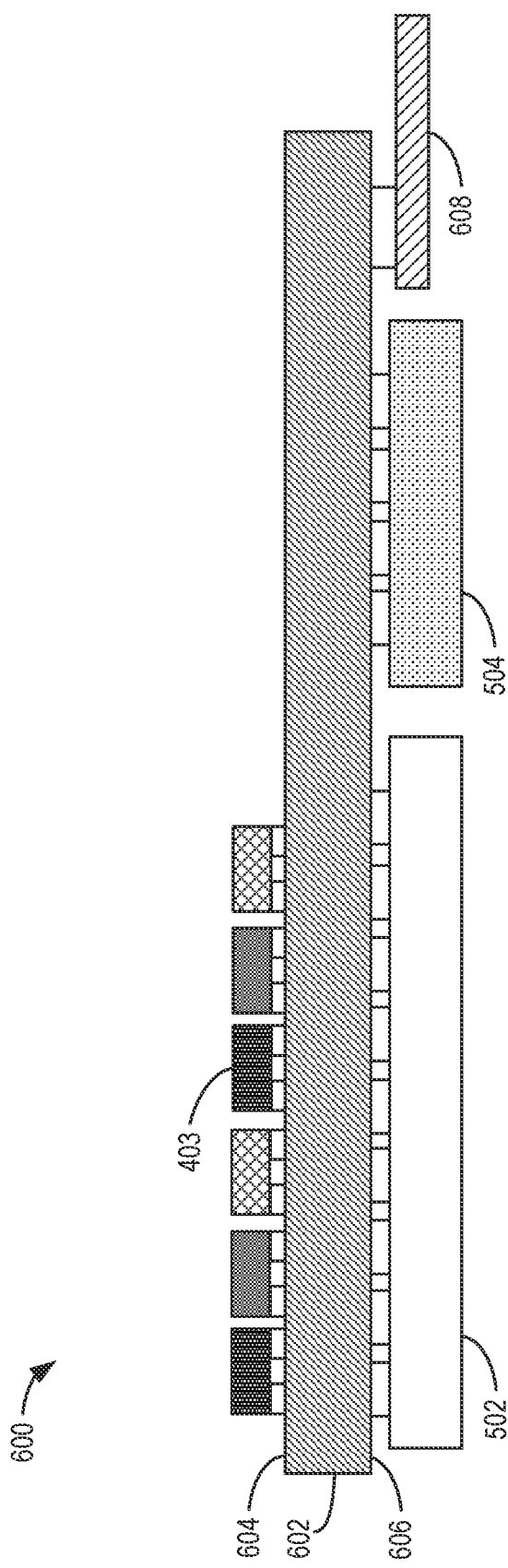
FIG. 6 is a side view of an example micro-LED assembly implemented in the example micro-LED display of FIGS. 4 and/or 5.

FIG. 6 is a side view of an example micro-LED assembly 600 that can be implemented in the example micro-LED display 400 of FIGS. 4 and/or 5. For example, the micro-LED assembly 600 electrically couples ones of the micro-LEDs 403, the matrix driver circuit(s) 502, and the assist driver circuit(s) 504 via an example substrate 602. In the illustrated example of FIG. 6, the micro-LEDs 403 are coupled to a first example side 604 of the substrate 602, and the matrix driver circuit 502 and the assist driver circuit 504 are coupled to a second example side 606 of the substrate 602 opposite the first side 604. In this example, an example controller 608 is further coupled to the second side 606 of the substrate 602. In other examples, at least one of the matrix driver circuit 502, the assist driver circuit 504, or the controller 608 can be coupled to the first side 604 instead. In this example, the controller 608 is a flexible printed circuit (FPC). In other examples, the controller 608 can be a printed circuit board (PCB).

In the illustrated example of FIG. 6, the substrate 602 includes conductive paths that electrically couple the micro-LEDs 403 to the matrix driver circuit 502, the matrix driver circuit 502 to the assist driver circuit 504, and/or the assist driver circuit 504 to the controller 608. In some examples, the substrate 602 enables sending and/or receiving of electrical signals between the micro-LEDs 403, the matrix driver circuit 502, the assist driver circuit 504, and/or the controller 608 via the conductive paths. In this example, by enabling the matrix driver circuit 502 to control and/or otherwise drive multiple ones of the micro-LEDs 403 of the pixel devices 404, a number of drivers in the micro-LED display 400 of FIG. 4 can be reduced compared to the micro-LED display 100 of FIG. 1, thus reducing parts costs associated with the micro-LED display 400 of FIG. 4. Furthermore, by implementing the matrix driver circuit 502, the assist driver circuit 504, and/or the controller 608 on the second side 606 of the substrate 602 opposite the first side 604 on which the micro-LEDs 403 are implemented, a surface area of the pixel devices 404 of FIG. 4 can be reduced compared to a surface area of the pixel devices 104 of FIG. 1. This, in turn, enables different pixel devices 404 to be positioned closer together, thereby increasing the resolution (e.g., the PPI) that can be achieved when compared to the micro-LED display 100 of FIG. 1.

Figure 7A:
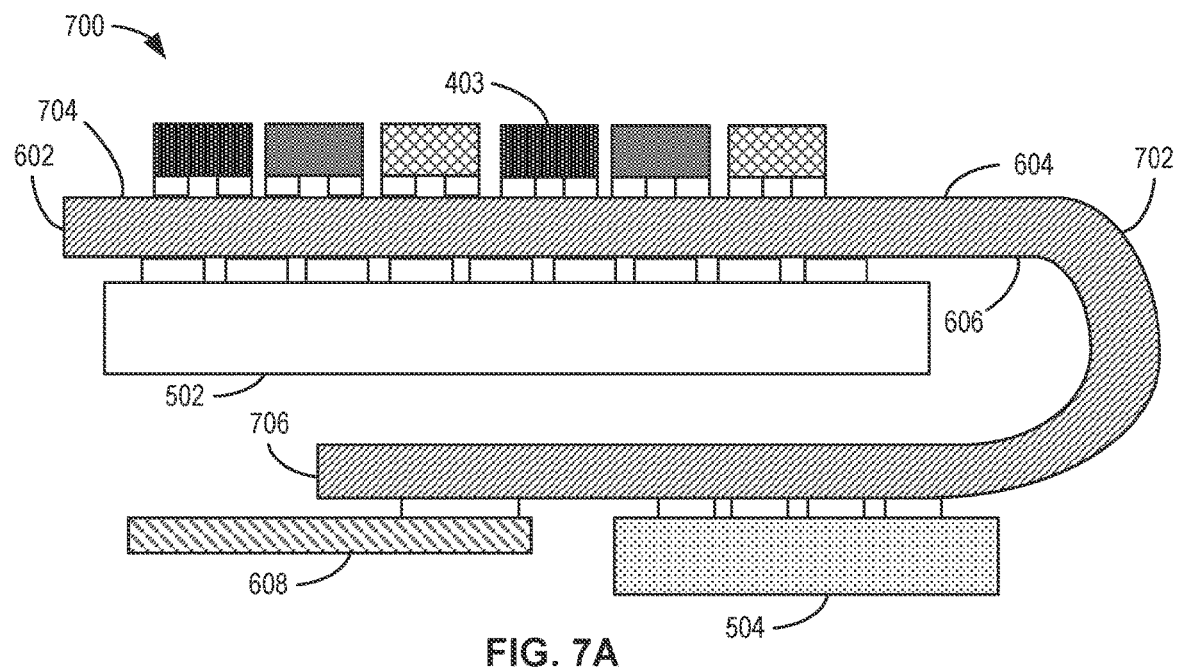
FIG. 7A illustrates a second example micro-LED assembly that can be implemented in the example micro-LED display of FIGS. 4 and/or 5.

FIG. 7A illustrates a second example micro-LED assembly 700 that can be implemented in the micro-LED display 400 of FIGS. 4 and/or 5 instead of the micro-LED assembly 600 of FIG. 6. In the illustrated example of FIG. 7A, the substrate 602 includes an example bend 702 between a first portion (e.g., an upper portion) 704 and a second portion (e.g., a lower portion) 706 of the substrate 602. In this example, the bend 702 is a 180-degree bend. In other examples, the bend 702 can be different (e.g., 90 degrees, 120 degrees, etc.) and/or the substrate 602 can include multiple bends. In this example, a length of the first portion 704 is greater than a corresponding length of the second portion 706. In this example, the micro-LEDs 403 are coupled to the first side 604 on the first portion 704 of the substrate 602, and the matrix driver circuit 502 is coupled to the second side 606 on the first portion 704 of the substrate 602. Furthermore, the assist driver circuit 504 and the controller 608 are coupled to the first side 604 on the second portion 706 of the substrate 602. In some examples, by including the bend 702, the second micro-LED assembly 700 of FIG. 7A can have a reduced length and/or width compared to the micro-LED assembly 600 of FIG. 6. As such, when using the second micro-LED assembly 700 of FIG. 7A instead of the micro-LED assembly 600 of FIG. 6, the micro-LED display 400 can be implemented on electronic devices having a relatively small display area (e.g., a smartwatch).

Figure 7B:
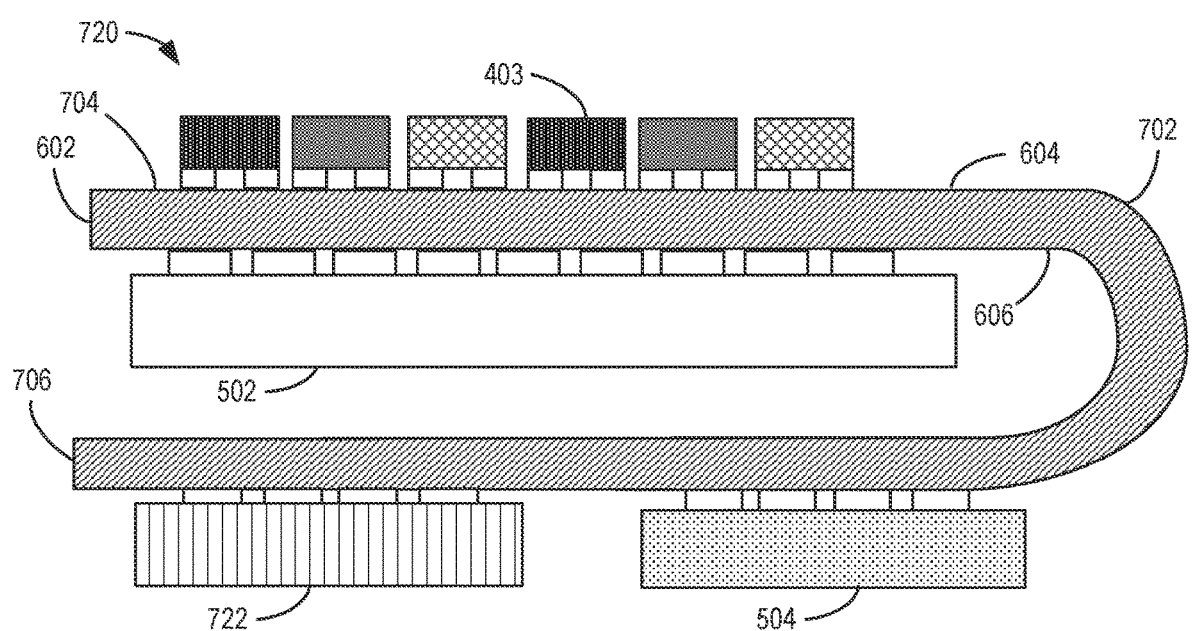
FIG. 7B illustrates a third example micro-LED assembly that can be implemented in the example micro-LED display of FIGS. 4 and/or 5.

FIG. 7B illustrates a third example micro-LED assembly 720 that can be implemented in the micro-LED display 400 of FIGS. 4 and/or 5 instead of the micro-LED assembly 600 of FIG. 6 and/or the second micro-LED assembly 700 of FIG. 7A. The third micro-LED assembly 720 is substantially the same as the second micro-LED assembly 720 of FIG. 7A, but includes an example timing controller 722 coupled to the first side 604 of the second portion 706 instead of the controller 608 of FIG. 7A. Furthermore, in this example, a length of the first portion 704 is less than a corresponding length of the second portion 706. Similar to the second micro-LED assembly 700 of FIG. 7A, the third micro-LED assembly 720 of FIG. 7B may be used for applications in which the micro-LED display 400 is implemented in electronic devices having a relatively small display area (e.g., a smartwatch, a mobile device, etc.).

Figure 8:
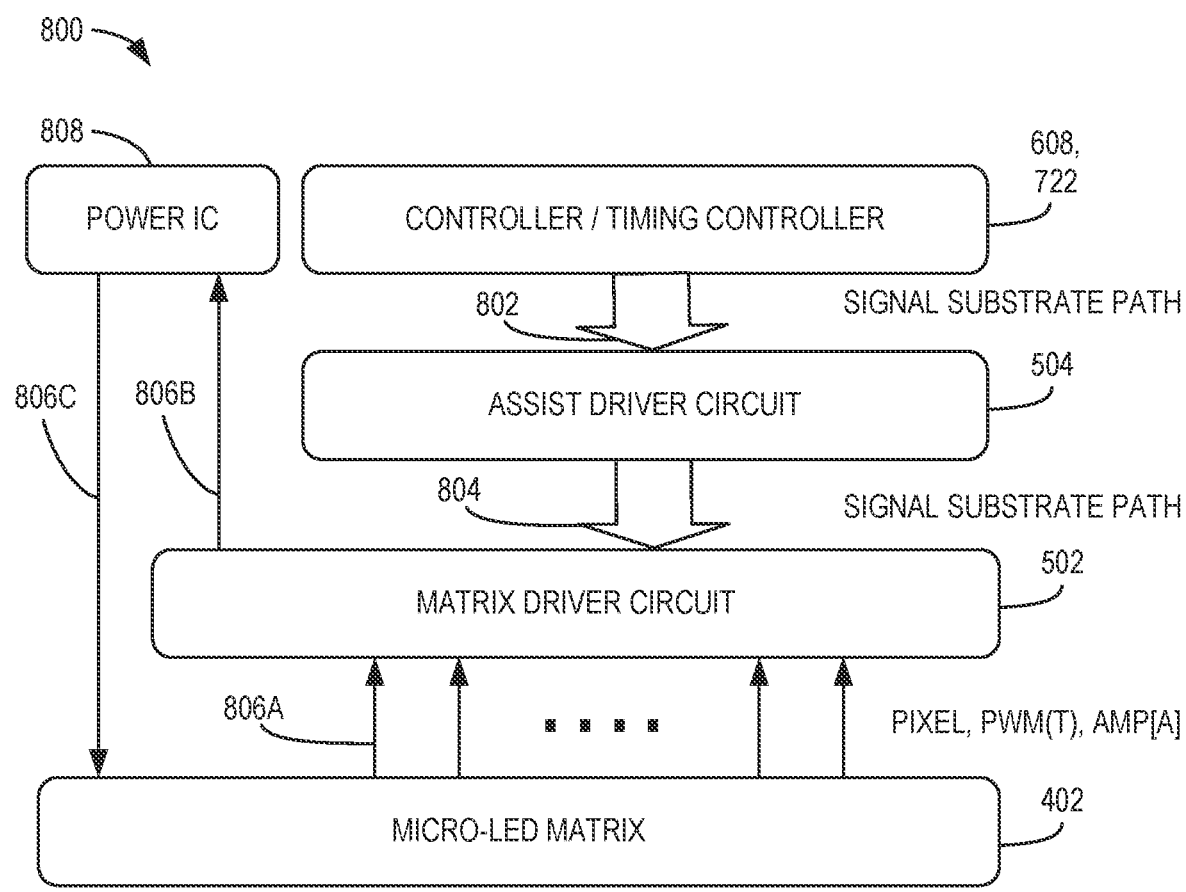
FIG. 8 illustrates an example process flow that may be implemented to control the micro-LED display of FIGS. 4 and/or 5.

FIG. 8 illustrates an example process flow that may be implemented to control the micro-LED display 400 of FIGS. 4 and/or 5. In the illustrated example of FIG. 8, at least of one of the controller 608 of FIGS. 6 and/or 7A or the timing controller 722 of FIG. 7B provides, via conductive paths of the substrate 602, an example control signal (e.g., a data signal) 802 to the example assist driver circuit 504. In some examples, the control signal 802 includes data associated with one or more images to be displayed by the micro-LED display 400. In some examples, the timing controller 722 determines timing characteristics of PWM signals to be provided to the matrix driver circuit(s) 502, and the timing controller 722 provides the determined timing characteristics in the control signal 802. Based on the control signal 802, the assist driver circuit 504 provides one or more example input signals 804 to the matrix driver circuit(s) 502 via ones of the conductive paths in the substrate 602. For example, the input signals 804 can include PWM signals, scan signals, gray level bit data corresponding to different columns of the micro-LED matrix 402, and/or current data corresponding to the different columns of the micro-LED matrix 402.

In this example, current flows in an example loop 806A, 806B, 806C that electrically couples the matrix driver circuit(s) 502, the micro-LED matrix 404, and an example power integrated circuit (IC) 808. In some examples, the micro-LED matrix 402 operates based on the current through the loop 806A, 806B, 806C. For example, ones of the micro-LEDs 403 of the micro-LED matrix 402 are turned on and off based on the current to vary a color and/or brightness of the micro-LED display 400. In some examples, the matrix driver circuits 502 select, by controlling the current through the loop 806A, 806B, 806C, ones of the micro-LEDs 403 that are to be turned on, durations for which the ones of the micro-LEDs 403 are turned on, and/or amplitude of current provided to the ones of the micro-LEDs 403. In the illustrated example of FIG. 8, the power IC 808 provides power to the matrix driver circuit(s) 502 and/or the micro-LED matrix 402.

Figure 9:
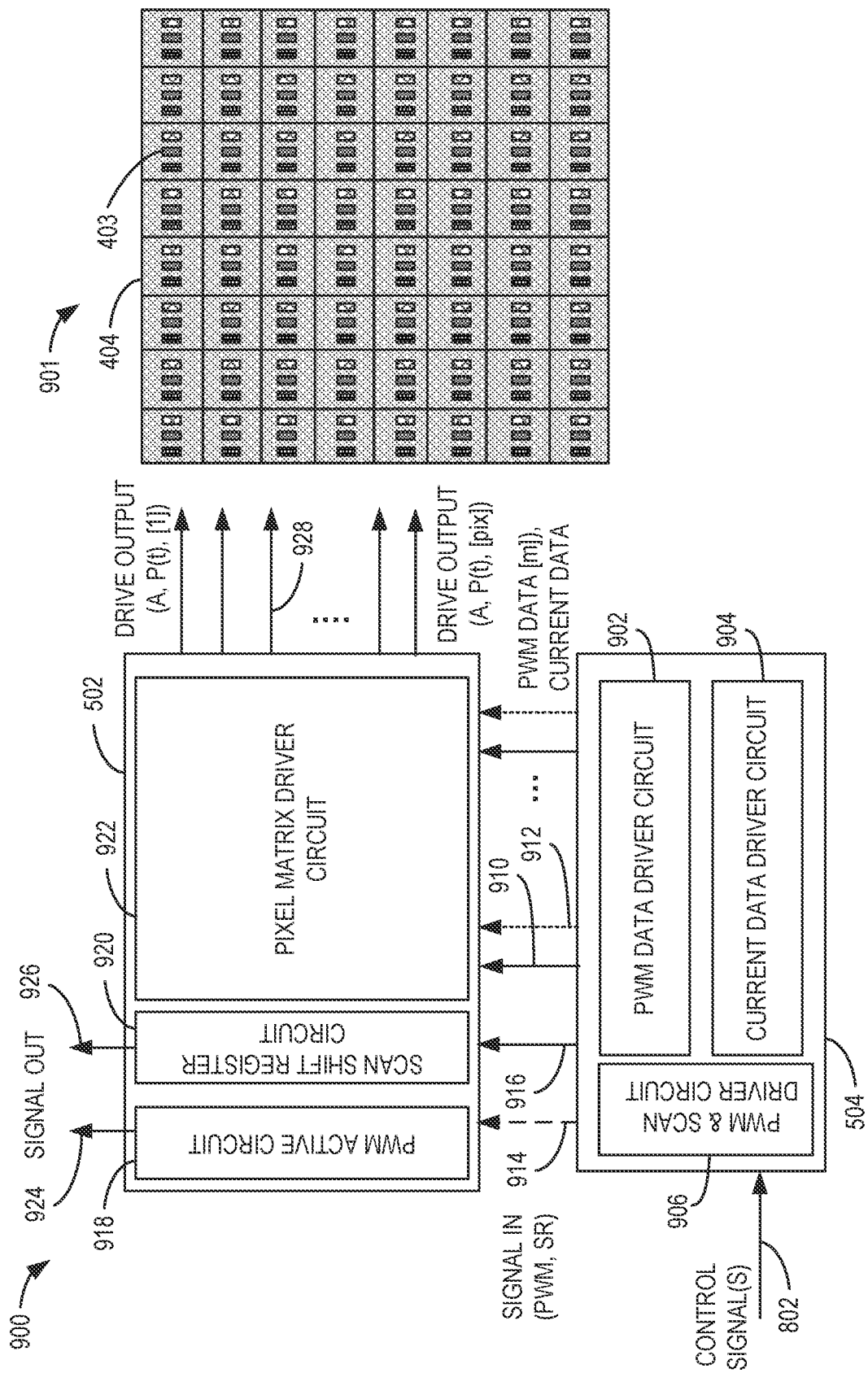
FIG. 9 is a schematic illustration of an example micro-LED driving system to control the micro-LED display of FIGS. 4 and/or 5.

FIG. 9 is a schematic illustration of an example micro-LED driving system 900 for controlling the micro-LED display 400 of FIGS. 4 and/or 5. In the illustrated example of FIG. 9, a combination of the assist driver circuit 504 and the matrix driver circuit 502 is used to control corresponding ones of the pixel devices 404 of the micro-LED display 400.

For example, the assist driver circuit 504 and the matrix driver circuit 502 in this example control an example sub-matrix 901 of the pixel devices 404, where the sub-matrix 901 corresponds to a particular region of the micro-LED display 400. In this example, the sub-matrix 901 includes at least 100 of the pixel devices 404. In some examples, the sub-matrix 901 includes up to 100,000 of the pixel devices 404.

In the illustrated example of FIG. 9, the assist driver circuit 504 includes an example PWM data driver circuit (e.g., a pixel PWM data driver circuit) 902, an example current data driver circuit (e.g., a pixel current amplitude data driver circuit) 904, and an example PWM and scan driver circuit 906. In the illustrated example of FIG. 9, the assist driver circuit 504 obtains and/or otherwise receives one or more of the example control signals 802 from the controller 608 of FIG. 6 and/or the timing controller 722 of FIG. 7B. In some examples, the control signals 802 include data representing one or more images to be displayed by the micro-LED display 400. Furthermore, the control signals 802 can include timing data indicating durations for which one or more of the micro-LEDs 403 of the pixel devices 404 are to be turned on and/or off.

In the illustrated example of FIG. 9, the PWM data driver circuit 902 generates example PWM data 910 based on the control signals 802. For example, the PWM data driver circuit 902 generates the PWM data 910 for each column of the pixel devices 404 in FIG. 9. In this example, the PWM data 910 includes gray level bit data for each of the micro-LEDs 403 in the corresponding column of the pixel devices 404. In such examples, the gray level bit data determines a color and/or brightness of light emitted by each of the pixel devices 404. For example, different gray level bit data is generated for each of the red, green, and blue micro-LEDs 403 of a corresponding pixel device 404. In some examples, the color and/or brightness of light emitted by the pixel device 404 may be adjusted by individually adjusting the gray levels of the red, green, and blue micro-LEDs 403 included in the pixel device 404. In some examples, the gray level bit data is 8-bit data, 10-bit data, 12-bit data, 16-bit data, etc.

In this example, the current data driver circuit 904 generates example current data 912 based on the control signals 802. For example, the current data driver circuit 904 generates the current data 912 for each column of the pixel devices 404. In this example, the current data 912 indicates an amplitude of current to be supplied to each of the micro-LEDs 403 in the corresponding column. In some examples, the amplitude is a fixed amplitude across the micro-LEDs 403. Additionally, the PWM and scan driver circuit 906 generates, based on the control signal(s) 802, one or more example PWM signals 914 and one or more example scan signals 916 that are provided to the matrix driver circuit 502.

In the illustrated example of FIG. 9, the matrix driver circuit 502 includes an example PWM active circuit 918, an example scan shift register circuit 920, and an example pixel matrix driver circuit 922 electrically and/or operatively coupled to each of the micro-LEDs 403 in the sub-matrix 901. In this example, the PWM active circuit 918 receives and/or otherwise obtains the PWM signal(s) 914 from the PWM and scan driver circuit 902. Furthermore, the scan shift register circuit 920 receives and/or otherwise obtains the scan signal(s) 916 from the PWM and scan driver circuit 902. In some examples, the PWM active circuit 918 further provides the PWM signal(s) 914 as example output PWM signal(s) 924 to one or more additional matrix driver circuits 502 of the micro-LED display 400, and the scan shift register circuit 920 further provides the scan signal(s) 916 as example output scan signal(s) 926 to the one or more additional matrix driver circuits 502. Accordingly, the scan signal(s) 916 and/or the PWM signals 914 can pass through multiple ones of the matrix driver circuits 502, thus enabling the assist driver circuit 504 to control multiple ones of the matrix driver circuits 502.

In the illustrated example of FIG. 9, the pixel matrix driver circuit 922 controls ones of the pixel devices 404 in the sub-matrix 901 based on example drive output signals 928. In this example, each of the drive output signals 928 corresponds to one of the micro-LEDs 403 of a corresponding one of the pixel devices 404. In some examples, each of the drive output signals 928 indicates an amplitude A of current to be provided to the corresponding one of the micro-LEDs 403, and further indicates a duration for which the current is to be provided, where the duration is based on a pulse width of a pulse signal P(t) for the corresponding one of the micro-LEDs 403. In some examples, the PWM data 910 includes both column and row information to enable selection of individual ones of the micro-LEDs 403 controlled by corresponding ones of the drive output signals 928.

Figure 10:
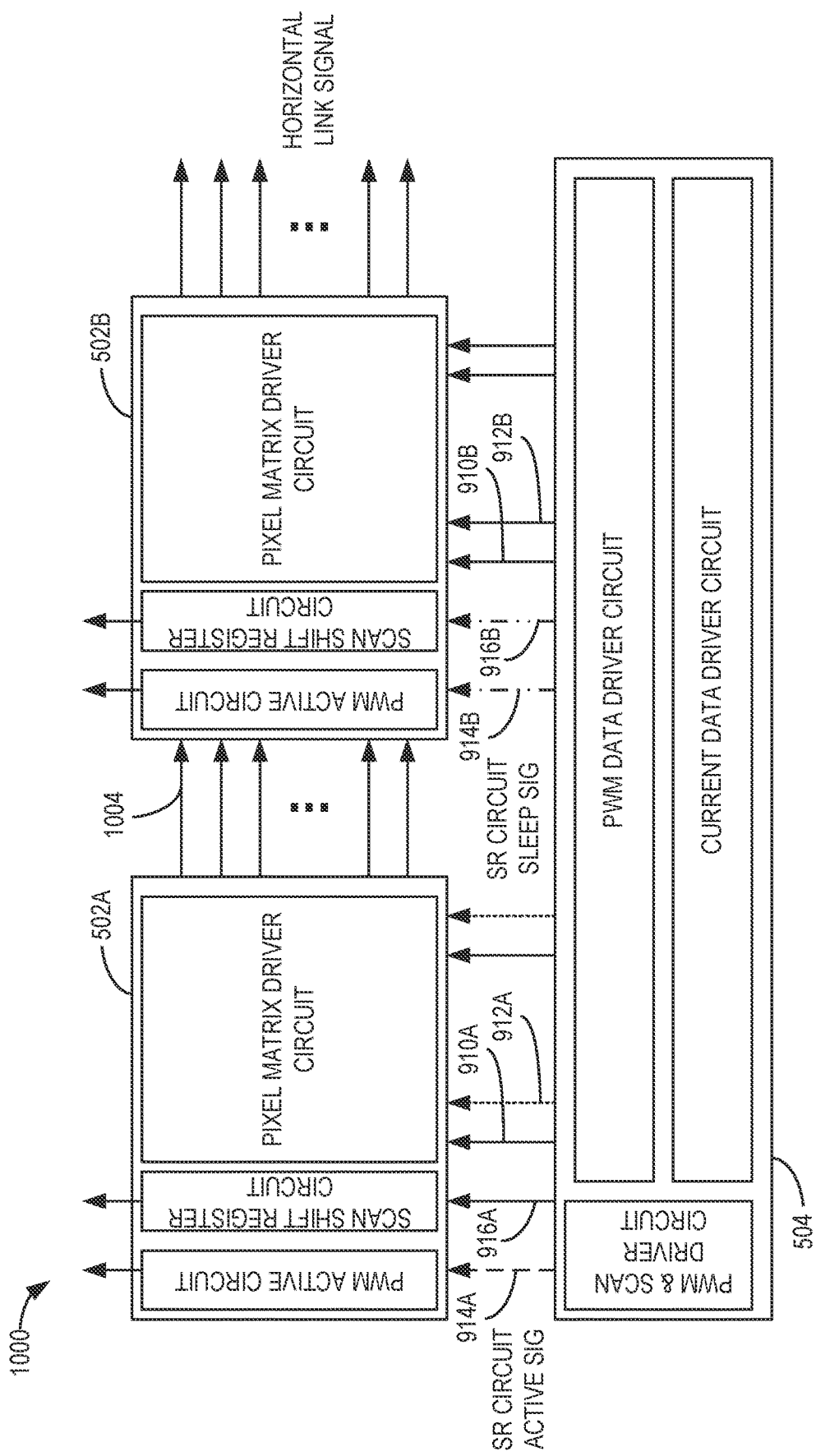
FIG. 10 is a schematic illustration of a second example micro-LED driving system for controlling multiple ones of the example matrix driver circuit of the micro-LED display of FIGS. 4 and/or 5.

FIG. 10 is a schematic illustration of a second example micro-LED driving system 1000 for controlling multiple ones of the example matrix driver circuit 502 of the micro-LED display 400 of FIGS. 4 and/or 5. In the illustrated example of FIG. 10, the assist driver circuit 504 controls and/or provides data to a first example matrix driver circuit 502A and/or a second example matrix driver circuit 502B. In this example, the first and second matrix driver circuits 502A, 502B are substantially the same as the matrix driver circuit 502 shown in FIG. 9. In this example, the first and second matrix driver circuits 502A, 502B of FIG. 10 control different portions (e.g., different sub-matrices of the pixel devices 404) of the micro-LED display 400.

In the illustrated example of FIG. 10, the assist driver circuit 504 provides first example PWM signal(s) 914A, first example scan signal(s) 916A, first example PWM data 910A, and first example current data 912A to the first matrix driver circuit 502A. In some examples, the assist driver circuit 504 also provides second example PWM signal(s) 914B, second example scan signal(s) 916B, second example PWM data 910B, and second example current data 912B to the second matrix driver circuit 502B. Alternatively, instead of the assist driver circuit 504 providing data and/or signals directly to the second matrix driver circuit 502B, signals and/or data are provided to the second matrix driver circuit 502B via the first matrix driver circuit 502A. For example, the second matrix driver circuit 502B can obtain at least one of the second PWM signal(s) 914B, the second scan signal 916B, the second PWM data 910B, or the second current data 912B from the first matrix driver circuit 502A via example horizontal links 1004 between the first and second matrix driver circuits 502A, 502B. As such, the second micro-LED driving system 1000 of FIG. 10 enables passive-active driving of the matrix driver circuits 502A, 502B, in which the assist driver circuit 504 actively drives the first matrix driver circuit 502A via signals sent directly thereto, and passively drives the second matrix driver circuit 502B via the first matrix driver circuit 502A.

Figure 11:
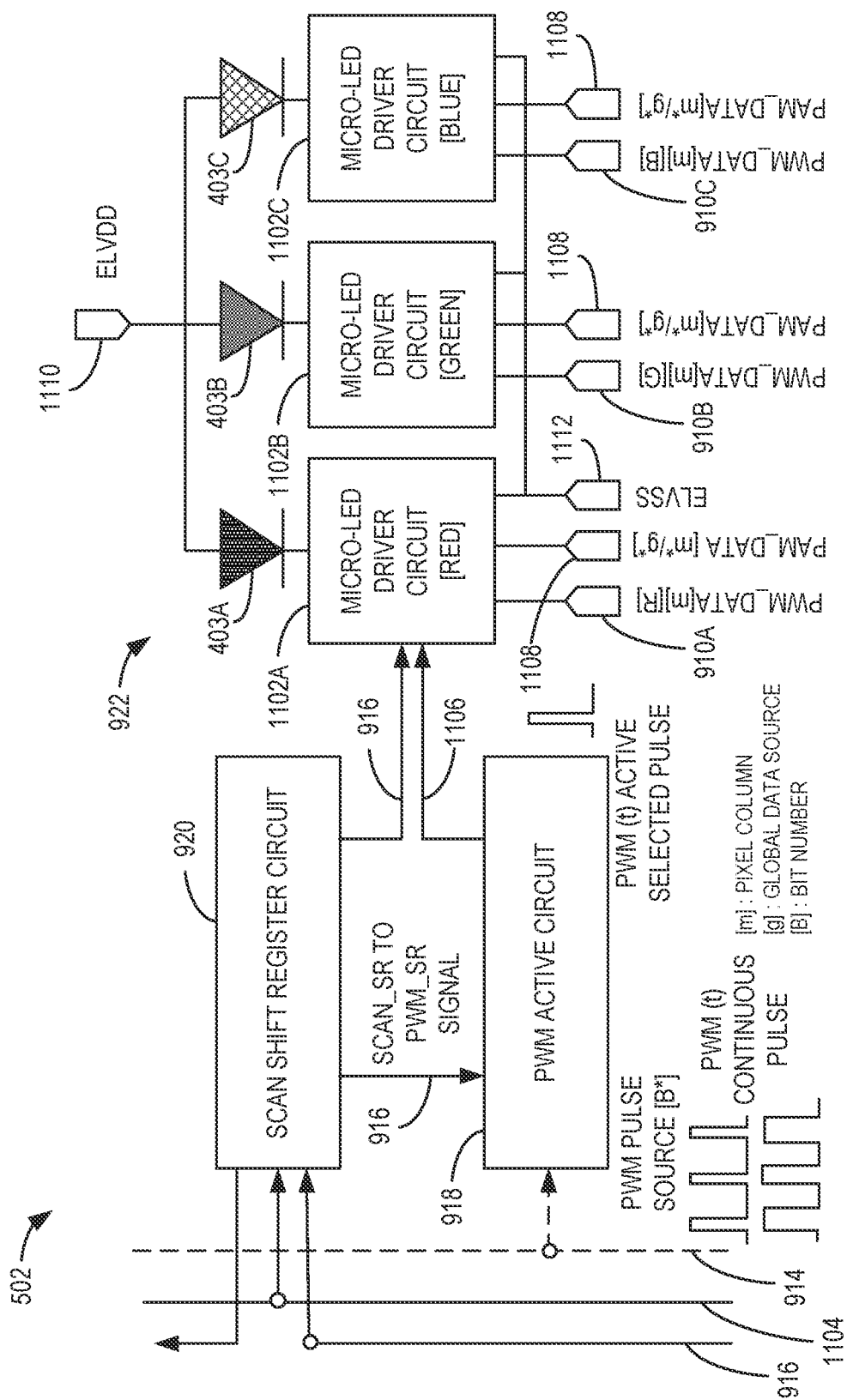
FIG. 11 illustrates a detailed view of the example matrix driver circuit of FIGS. 9 and/or 10.

FIG. 11 illustrates a detailed view of the example matrix driver circuit 502 including the example PWM active circuit 918, the example scan shift register circuit 920, and the example pixel matrix driver circuit 922 of FIG. 9. In the illustrated example of FIG. 11, the example pixel matrix driver circuit 922 controls a corresponding one of the pixel devices 404 of the sub-matrix 901 of FIG. 9. In this example, the pixel matrix driver circuit 922 includes example micro-LED driver circuits 1102A, 1102B, 1102C. The first example micro-LED driver circuit 1102A is operatively and/or electrically coupled to the first micro-LED 403A, the second example micro-LED driver circuit 1102B is operatively and/or electrically coupled to the second micro-LED 403B, and the third example micro-LED driver circuit 1102C is operatively and/or electrically coupled to the third micro-LED 403C.

In the illustrated example of FIG. 11, the PWM active circuit 918 receives the PWM signal(s) 914 from the assist driver circuit 504. In this example, the PWM signal 914 includes one or more bit pulse source signals corresponding to different bits of the PWM data 910 provided to the pixel matrix driver circuit 922. For example, each of the bit pulse source signals is a continuous pulse signal having a different pulse width and/or frequency. Furthermore, in this example, the scan shift register circuit 920 receives the scan signal(s) 916 from the assist driver circuit 504, and receives a second example scan signal 1104 from the assist driver circuit 504. In some examples, the scan shift register circuit 920 provides the scan signal(s) 916 to the PWM active circuit 918.

In this example, the scan shift register circuit 920 scans rows of the pixel matrix driver circuit 922 in sequence to enable operation of the micro-LEDs 403. In particular, the scan shift register circuit 920 provides the scan signal(s) 916 to rows of the pixel matrix driver circuit 922 in sequence. In the illustrated example of FIG. 11, the micro-LED driver circuits 1102A, 1102B, 1102C correspond to a first row (e.g., an active row, a selected row) of the pixel matrix driver circuit 922. In some examples, each of the micro-LED driver circuits 1102A, 1102B, 1102C is connected to a scan line (e.g., a common line) of the first row through which the scan signal(s) 916 are passed to perform a row scan.

In some examples, during and/or prior to the scanning of the first row, data (e.g., the PWM data 910) can be written to corresponding ones of the micro-LED driver circuits 1102A, 1102B, 1102C in the first row. For example, first example PWM data 910A is written to the first micro-LED driver circuit 1102A, second example PWM data 910B is written to the second micro-LED driver circuit 1102B, and third example PWM data 910C is written to the third micro-LED driver circuit 1102C. Furthermore, example pulse amplitude (PAM) data 1108 is provided to each of the micro-LED driver circuits 1102A, 1102B, 1102C. In some examples, the PAM data 1108 includes a global (e.g., fixed) value representing an amplitude of the current to be supplied to the micro-LEDs 403.

In the illustrated example of FIG. 11, the PWM active circuit 918 selects, based on the scan signal(s) 916, an example active PWM signal 1106 from the PWM signal(s) 914. In this example, the active PWM signal 1106 is provided to the micro-LED driver circuits 1102A, 1102B, 1102C during the scan of the first row. In some examples, the active PWM signal 1106 corresponds to a selected bit pulse source signal from the PWM signal(s) 914.

In the illustrated example of FIG. 11, each of the micro-LED driver circuits 1102A, 1102B, 1102C controls flow of current through a respective one of the micro-LEDs 403 by operating one or more switches (e.g., transistor switches) therein. In this example, the first micro-LED driver circuit 1102A is to electrically couple the first micro-LED 403A and an example voltage drain 1110 to an example voltage source 1112, the second micro-LED driver circuit 1102B is to electrically couple the second micro-LED 403B and the voltage drain 1110 to the voltage source 1112, and the third micro-LED driver circuit 1102C is to electrically couple the third micro-LED 403C and the voltage drain 1110 to the voltage source 1112.

In some examples, the first micro-LED driver circuit 1102A operates one or more switches (e.g., transistor switches) between the first micro-LED 403A and the voltage source 1112 based on the scan signals 916, the active PWM signal 1106, and the first PWM data 910A. In some examples, the switches are transistor switches that can switch between an active (e.g., open) state and an inactive (e.g., closed) state based on a current of a signal provided thereto. For example, signals and/or current can pass through the switches in the active state, and the signals do not pass through the switches in the inactive state.

In this example, when the switches of the first micro-LED driver circuit 1102A are in the active state, current can flow between the voltage drain 1110 and the voltage source 1112 through the first micro-LED 403A, thus causing the first micro-LED 403A to emit light. Similarly, the second micro-LED driver circuit 1102B controls current flow through the second micro-LED 403B by operating one or more switches based on the scan signals 916, the active PWM signal 1106, and the second PWM data 910B, and the third micro-LED driver circuit 1102C controls current flow through the third micro-LED 403C by operating one or more switches based on the scan signals 916, the active PWM signal 1106, and the third PWM data 910C.

Figure 12:
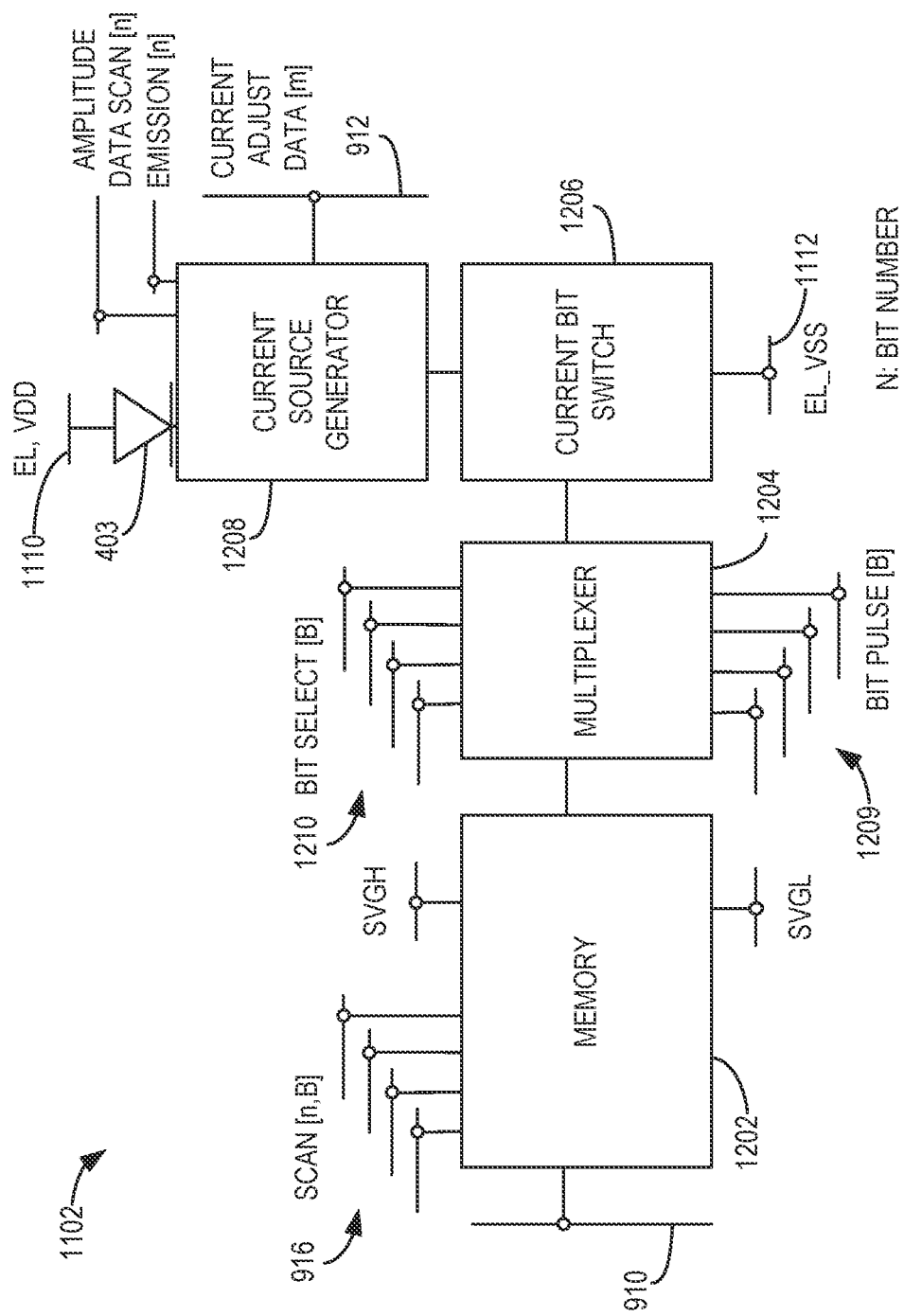
FIG. 12 illustrates an example micro-LED driver circuit that may be implemented in the example pixel matrix driver circuit of FIGS. 9 and/or 11.

FIG. 12 illustrates an example micro-LED driver circuit 1102 that may be implemented in the example pixel matrix driver circuit 922 of FIGS. 9 and/or 11. For example, the micro-LED driver circuit 1102 can correspond to one of the first micro-LED driver circuit 1102A, the second micro-LED driver circuit 1102B, or the third micro-LED driver circuit 1102C of FIG. 11. In the illustrated example of FIG. 12, the micro-LED driver circuit 1102 includes example memory (e.g., static random-access memory (SRAM)) 1202, an example multiplexer (e.g., a bit select multiplexer) 1204, and example current bit switch 1206, and an example current source generator 1208.

In this example, the memory 1202 receives one or more of the scan signals 916 during a scan of the row in which the micro-LED driver circuit 1102 is implemented. In particular, the scan signals 916 correspond to the particular row n in which the micro-LED driver circuit 1102 is implemented, and further correspond to each bit of the gray level bit data written to the memory 1202. For example, the memory 1202 receives and/or otherwise obtains the PWM data 910 corresponding to the particular column m of the pixel matrix driver circuit 922 in which the micro-LED driver circuit 1102 is implemented. During each scan of the row in which the micro-LED driver circuit 1102 is implemented, gray level bit data from the PWM data 910 is written to the memory 1202. In some examples, the gray level bit data is digital data having a binary value (e.g., 0 or 1) for each bit. For example, the gray level bit data includes at least B bits of data, where B is at least 10 (e.g., 14 bits, 16 bits, etc.). In some examples, the scan signals 916 are provided to the micro-LED driver circuit 1102 for scanning each bit of data in the memory 1202. For example, for gray level data having 16 bits, the scan signals 916 will be provided to the memory 1202 16 times to enable emission of each of the bits.

In this example, the multiplexer 1204 receives example bit pulse source signals 1209 corresponding to each of the B bits of data written to and/or stored in the memory 1202. For example, different ones of the bit pulse source signals 1209 can correspond to the B different bits of data. Furthermore, in this example, each of the bit pulse source signals 1209 corresponds to a different pulse width. In some examples, the pulse width of the bit pulse source signals 1209 increases for subsequent bits of data. For example, a first pulse width corresponding to a first bit of data is less than a second pulse width corresponding to a second bit of data, where the second bit is subsequent to the first bit in the gray level bit data stored in the memory 1202.

In this example, the multiplexer 1204 includes one or more example bit select switches 1210. In some examples, the bit select switches 1210 are operated based on the scan signals 916 provided to the micro-LED driver circuit 1102. For example, the multiplexer 1204 moves a first bit select switch of the bit select switches 1210 to the active state when a corresponding one of the scan signals 916 is received by the first bit select switch. In some examples, when the first bit select switch is in the active state, the multiplexer 1204 can read and/or otherwise obtain data from a corresponding first bit of the gray level bit data. In some examples, when the first bit select switch is in the active state, remaining ones of the bit select switches 1210 are in the inactive state. In some examples, the multiplexer 1204 moves each of the bit select switches 1210 to the active state in sequence in order to read subsequent bits of data from the gray level bit data.

In this example, the multiplexer 1204 operates the bit pulse source signals 1209 based on corresponding bit values in the gray level data. For example, when the first bit select switch is in the active state and the corresponding first bit has a first value (e.g., 1), the multiplexer 1204 enables (e.g., turns on, makes active) a corresponding one of the bit pulse source signals 1209. For example, the multiplexer 1204 operates a transistor switch operatively and/or electrically coupled to the one of the bit pulse source signals 1209, and the one of the bit pulse source signals 1209 is provided to the current bit switch 1206 when the transistor switch is in the active state. Conversely, when the corresponding first bit has a second value (e.g., 0), the transistor switch is inactive, such that the current bit switch 1206 does not receive the corresponding one of the bit pulse source signals 1209. For example, for an example 4-bit gray level bit data sequence of 0100, the multiplexer 1204 receives the scan signals 916 to open and/or otherwise make active each of the four corresponding bit select switches 1210 in sequence. In such an example, a second bit of the gray level bit data has the first bit value of 1, and first, third, and fourth bits of the gray level bit data have the second bit value of 0. As such, a second one of the bit pulse source signals 1209 is provided to the current bit switch 1206 when a corresponding second one of the bit select switches 1210 is closed. Furthermore, the first, third, and fourth ones of the bit pulse source signals 1209 are not provided to the current bit switch 1206.

In the illustrated example of FIG. 12, the current bit switch 1206 is operated based on the bit pulse source signals 1209 provided thereto. In this example, the current bit switch 1206 is a transistor switch that may be turned on when a signal is provided thereto. For example, when one of the bit pulse source signals 1209 is provided to the current bit switch 1206, the current bit switch 1206 is turned on and/or otherwise made active when the one of the bit pulse source signals 1209 has a non-zero value (e.g., a non-zero amplitude). In some examples, the current bit switch 1206 is turned on for a duration corresponding to a pulse width of the one of the bit pulse source signals 1209.

In this example, the current bit switch 1206 is operatively and/or electrically coupled between the voltage source 1112 and the voltage drain 1110. Furthermore, the example current source generator 1208 is electrically coupled between the current bit switch 1206 and the voltage drain 1110, and the micro-LED 403 is electrically coupled between the voltage drain 1110 and the current source generator 1208. When the current bit switch 1206 is turned on and/or otherwise active, the current source generator 1208 enables a flow of current between the voltage source 1112 and the voltage drain 1110. In such examples, the current flows through the micro-LED 403 to cause illumination thereof. In some examples, an amplitude of the current generated by the current source generator 1208 is based on the current data 912 provided to the micro-LED driver circuit 1102 from the current data driver circuit 904 of FIG. 9. Furthermore, a gray level (e.g., brightness) of the micro-LED 403 is controlled based on a number of the bit pulse source signals 1209 provided to the current bit switch 1206 and/or the pulse widths of the bit pulse source signals 1209 provided to the current bit switch 1206. For example, increasing the number of the bit pulse source signals 1209 provided and/or increasing the pulse widths thereof increases the duration for which the corresponding micro-LED 403 is illuminated.

Figure 13:
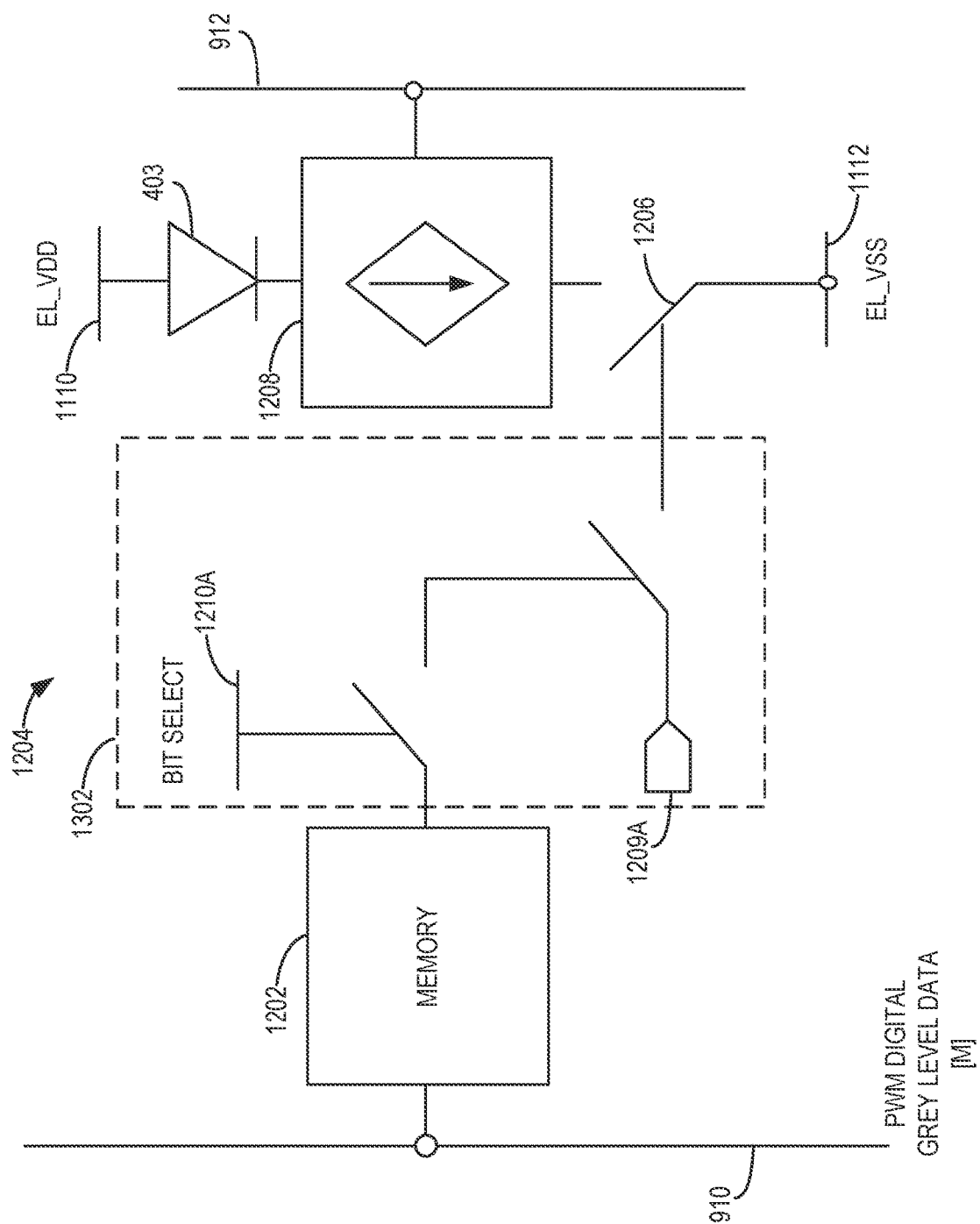
FIG. 13 illustrates a detailed view of the example micro-LED driver circuit of FIG. 12.

FIG. 13 illustrates a detailed view of the micro-LED driver circuit 1102 of FIG. 12. In the illustrated example of FIG. 13, an example bit select unit 1302 of the multiplexer 1204 of FIG. 12 is shown. In this example, the bit select unit 1302 includes a first bit select switch 1210A and a first bit pulse source signal 1209A corresponding to a first bit of the gray level bit data stored in the memory 1202. In this example, during a scan of the row in which the micro-LED driver circuit 1102 is implemented, the first bit select switch 1210 is turned on such that the first bit of the gray level data can be read from the memory 1202. In this example, in response to the first bit having a first value (e.g., 1), the first bit pulse source signal 1209A is provided to the current bit switch 1206. Conversely, in response to the first bit having a second value (e.g., 0), the first bit pulse source signal 1209A is not provided to the current bit switch 1206. In some examples, the multiplexer 1204 includes multiple ones of the bit select unit 1302 corresponding to the different bits of the gray level bit data.

Figure 14:
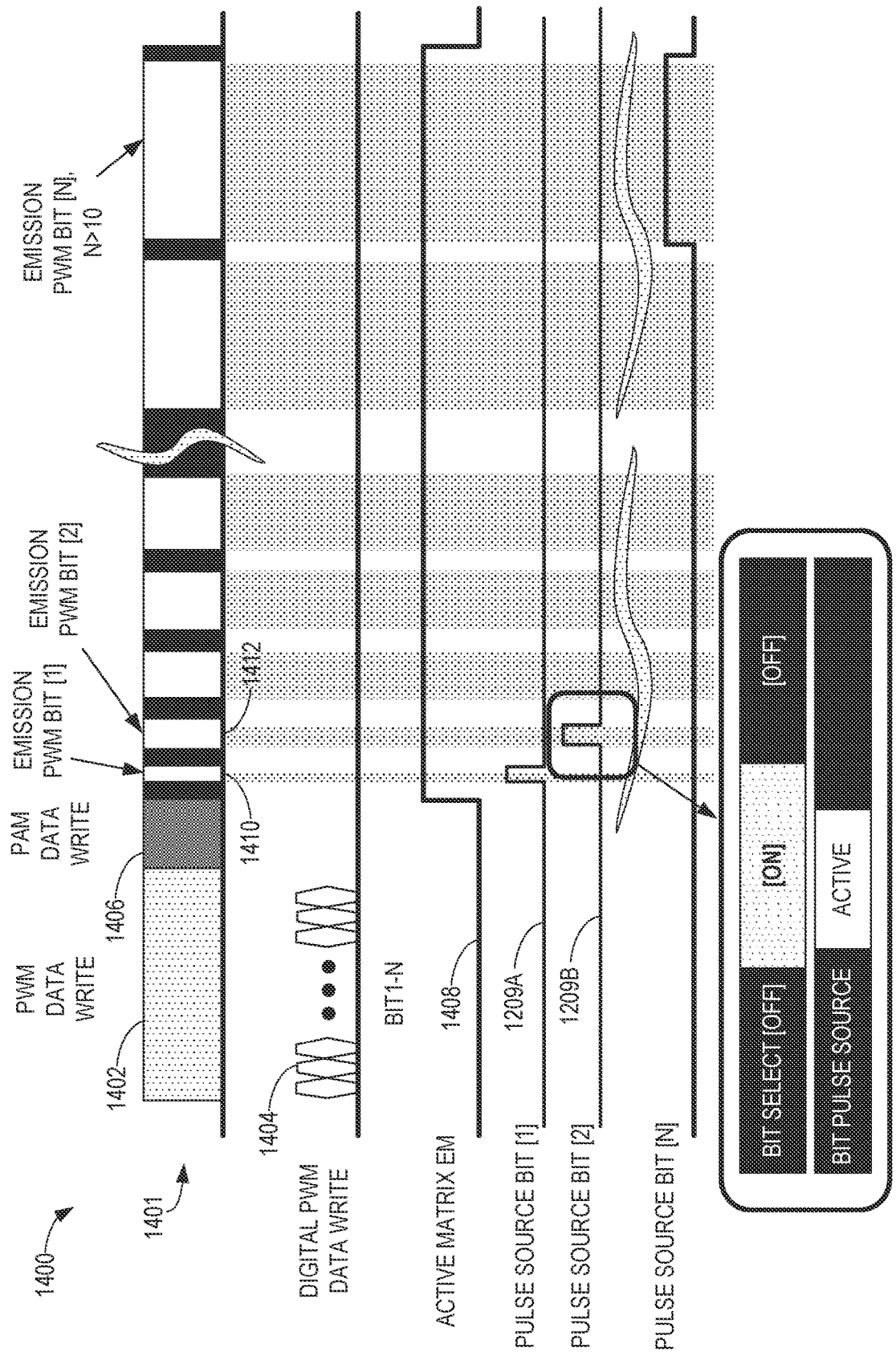
FIG. 14 illustrates a first example graph illustrating an example bit emission driving scheme for the micro-LED driver circuit of FIGS. 12 and/or 13.

FIG. 14 illustrates a first example graph 1400 illustrating an example bit emission driving scheme for the micro-LED driver circuit 1102 of FIGS. 11, 12, and/or 13. In the illustrated example of FIG. 14, the graph 1400 represents emissions of gray level bit data for a an example row scan 1401 of the example micro-LED driver circuit 1102. During a first example portion 1402 of the row scan 1401, the example PWM data 910 of FIGS. 9, 10, 11, 12, and/or 13 is written to the memory 1202. For example, example bits 1404 of the gray level bit data from the PWM data 910 is written to the memory 1202. In this example, the bits 1404 are a sequence of B binary digits (e.g., 0 or 1), where B is greater than or equal to 10. Furthermore, the example PAM data 1108 of FIG. 11 is written to the memory 1202 during a second example portion 1406 of the row scan 1401.

In this example, an example active emission signal 1408 is provided to the micro-LED driver circuit 1102. In some examples, emission of the bits 1404 of the gray level bit data can occur when the active emission signal 1408 is active and/or otherwise turned on (e.g., has a non-zero amplitude). In this example, during a third example portion 1410 of the row scan 1401, the multiplexer 1204 of FIG. 12 turns on the first bit select switch 1210A of FIG. 13 corresponding to a first bit of the bits 1404. As such, the multiplexer 1204 can select and/or read the first bit stored in the memory 1202. In this example, when the first bit has a first value (e.g., 1), the multiplexer 1204 enables the first bit pulse source signal 1209A to be provided to the current bit switch 1206 of FIGS. 12 and/or 13. In such examples, the first bit pulse source signal 1209A enables emission of the first bit of gray level bit data by the micro-LED 403 of FIGS. 12 and/or 13.

In this example, after reading and/or emission of the first bit, the multiplexer 1204 turns on a second one of the bit select switches 1210 corresponding to the second bit during a fourth example portion 1412 of the row scan 1401. As such, the multiplexer 1204 selects and/or reads a second bit from the bits 1404 stored in the memory 1202 during the fourth portion 1412 of the row scan 1401. In this example, based on a value of the second bit, the multiplexer 1204 enables or prevents a second example bit pulse source signal 1209B to be provided to the current bit switch 1206. In this example, the multiplexer 1204 selects and/or switches between subsequent ones of the bits 1404 up to an $B^{th}$ one of the bits 1404. In response to reading and/or emission of each of the B bits 1404, the row scan 1401 is complete. In some examples, one or more subsequent row scans are performed for subsequent rows of the pixel devices 404 of the micro-LED display 400 of FIG. 4 to display an image (e.g., a frame) thereupon.

Figure 15:
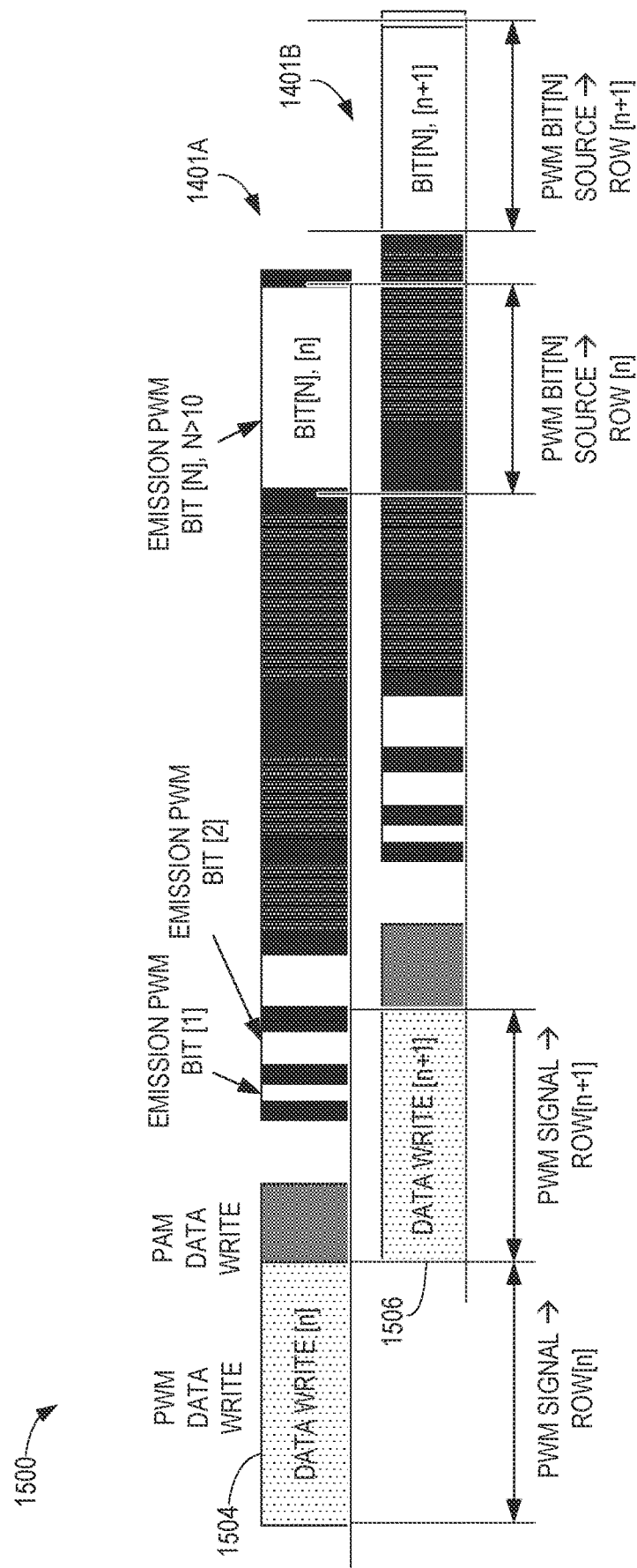
FIG. 15 illustrates a first example row scan and a second example row scan of the bit emission driving scheme of FIG. 14.

FIG. 15 illustrates a first example row scan 1401A and a second example row scan 1401B of the bit emission driving scheme of FIG. 14. For example, the first row scan 1401A may correspond to the row scan 1401 shown in FIG. 14 performed for first ones of the pixel devices 404 in a first row of the micro-LED display 400, and the second row scan 1401B is performed for second ones of the pixel devices 404 in a subsequent row of the micro-LED display 400. In some examples, the scan shift register circuit 920 of FIGS. 9 and/or 10 provides the scan signals 916 of FIG. 9 to the first row during the first row scan 1401A, and the scan shift register circuit 920 provides the scan signals 916 to the second row during the second row scan 1401B.

In some examples, the second row scan 1401B is offset (e.g., shifted) relative to the first row scan 1401A by a first example duration 1502. For example, during a first example data write portion 1504 of the first row scan 1401, the PWM data 910 corresponding to the first row of the micro-LED display 404 is written to the corresponding ones of the pixel devices 404. Upon completion of the first data write portion 1504, the scan signals 916 are provided to the first row to enable reading and/or emission of each bit of the PWM data 910 in the first row. Furthermore, in response to completion of the first data write portion 1504, the PWM data 910 corresponding to the second row of the micro-LED display 400 is written to the corresponding ones of the pixel devices 404 during a second example data write portion 1506 of the second row scan 1401B. In such examples, the second ones of the scan signals 916 are provided to the second row to enable reading and/or emission of each bit of the PWM data 910 in the second row. In some examples, one or more additional row scans are performed for subsequent rows of the micro-LED display 400 to cause emission of light from the corresponding micro-LEDs 403. In some examples, a row scan is performed for each row of the micro-LED display 400 for each frame (e.g., image) to be displayed thereon.

Figure 16:
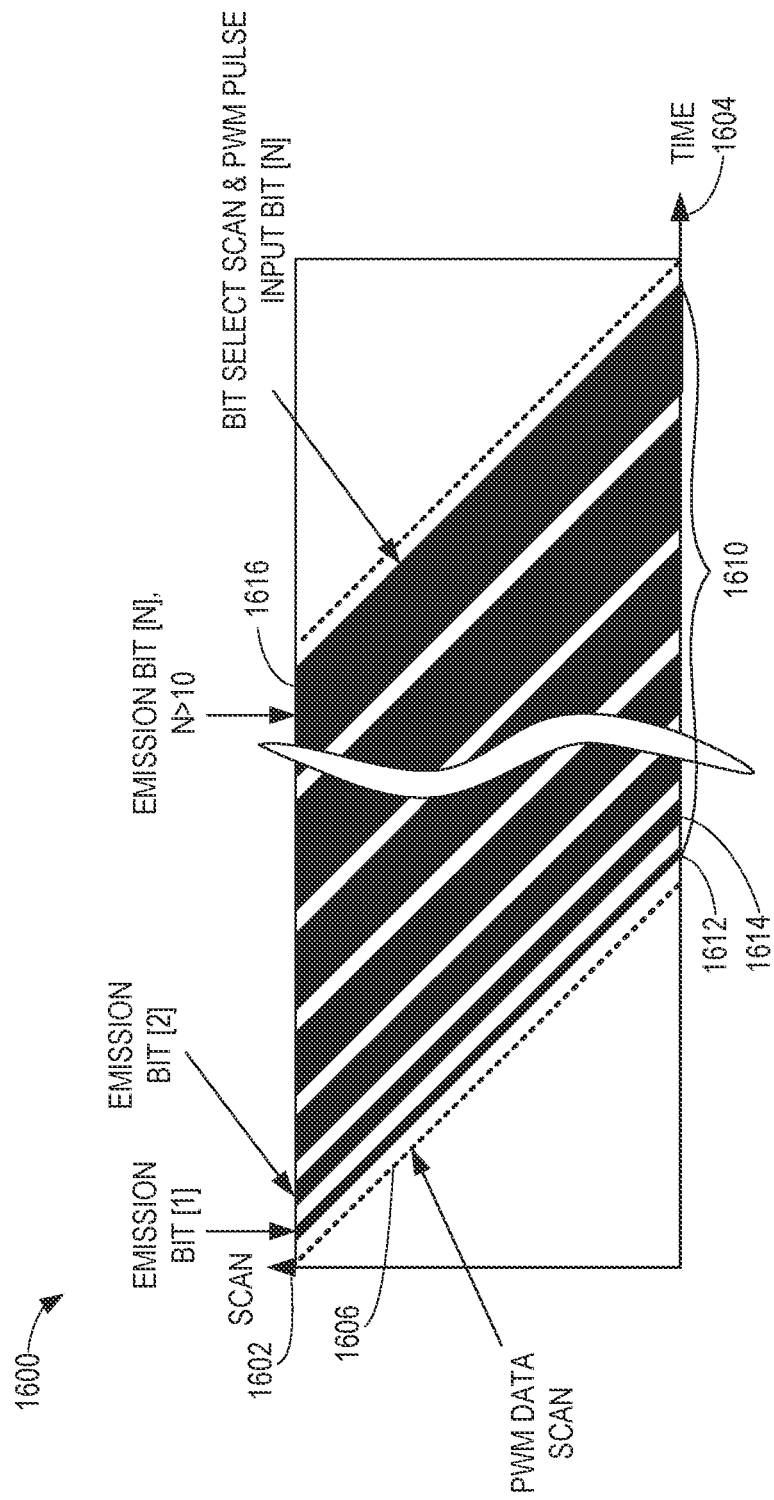
FIG. 16 is an example graph illustrating multiple row scans of the micro-LED display of FIGS. 4 and/or 5.

FIG. 16 is an example graph 1600 illustrating multiple row scans of the micro-LED display 400 of FIG. 4. In the illustrated example of FIG. 16, the graph 1600 includes an example vertical axis (e.g., y-axis) 1602 corresponding to the row scans, and an example horizontal axis (e.g., x-axis) 1604 corresponding to time. In this example, a first example portion 1606 of the graph 1600 represents PWM data write portions (e.g., the data write portions 1504, 1506 of FIG. 15) for subsequent row scans of the micro-LED display 400. During the first example portion 1606 of each row scan, the PWM data 910 is written to each of the pixel devices 404 of a corresponding row. For example, gray level bit data is written to the memory 1202 of each of the pixel devices 404. Furthermore, during an example scan portion 1610, the scan signals 916 of FIG. 9 are provided to the pixel devices 404 to cause emission of light by the corresponding micro-LEDs 403 based on the gray level bit data.

For example, during a first example bit emission portion 1612, a first one of the scan signals 916 is provided to the micro-LED driver circuits 1102 of the pixel devices 404. The first one of the scan signals 916 causes the micro-LED driver circuits 1102 to read first bits of the gray level bit data from the memory 1202, and causes emission of the micro-LEDs 403 based on values of the first bits. Similarly, during a second example bit emission portion 1614, a second one of the scan signals 916 is provided to the micro-LED driver circuits 1102 of the pixel devices 404. The second one of the scan signals 916 causes the micro-LED driver circuits 1102 to read second bits of the gray level bit data from the memory 1202, and causes emission of the micro-LEDs 403 based on values of the second bits. The above process repeats for each of the bits of the gray level bit data up to an $N^{th}$ example bit emission portion 1616. In some examples, the row scans illustrated in the graph 1600 of FIG. 16 are performed for each frame to be displayed by the micro-LED display 400.

In some examples, the assist driver circuit 504 includes means for generating PWM data. For example, the means for generating PWM data may be implemented by the PWM data driver circuit 902. In some examples, the PWM data driver circuit 902 may be instantiated by processor circuitry such as the example processor circuitry 1912 of FIG. 19. For instance, the PWM data driver circuit 902 may be instantiated by the example general purpose processor circuitry 2100 of FIG. 21 executing machine executable instructions such as that implemented by at least blocks 1708, 1716 of FIG. 17. In some examples, the PWM data driver circuit 902 may be instantiated by hardware logic circuitry, which may be implemented by an ASIC or the FPGA circuitry 2200 of FIG. 22 structured to perform operations corresponding to the machine readable instructions. Additionally or alternatively, the PWM data driver circuit 902 may be instantiated by any other combination of hardware, software, and/or firmware. For example, the PWM data driver circuit 902 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the assist driver circuit 504 includes means for generating current data. For example, the means for generating current data may be implemented by the current data driver circuit 904. In some examples, the current data driver circuit 904 may be instantiated by processor circuitry such as the example processor circuitry 1912 of FIG. 19. For instance, the current data driver circuit 904 may be instantiated by the example general purpose processor circuitry 2100 of FIG. 21 executing machine executable instructions such as that implemented by at least blocks 1710, 1716 of FIG. 17. In some examples, the current data driver circuit 904 may be instantiated by hardware logic circuitry, which may be implemented by an ASIC or the FPGA circuitry 2200 of FIG. 22 structured to perform operations corresponding to the machine readable instructions. Additionally or alternatively, the current data driver circuit 904 may be instantiated by any other combination of hardware, software, and/or firmware. For example, the current data driver circuit 904 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the assist driver circuit 504 includes means for generating PWM and scan signals. For example, the means for generating PWM and scan signals may be implemented by the PWM and scan driver circuit 906. In some examples, the PWM and scan driver circuit 906 may be instantiated by processor circuitry such as the example processor circuitry 1912 of FIG. 19. For instance, the PWM and scan driver circuit 906 may be instantiated by the example general purpose processor circuitry 2100 of FIG. 21 executing machine executable instructions such as that implemented by at least blocks 1704, 1706, 1712, 1714 of FIG. 17. In some examples, the PWM and scan driver circuit 906 may be instantiated by hardware logic circuitry, which may be implemented by an ASIC or the FPGA circuitry 2200 of FIG. 22 structured to perform operations corresponding to the machine readable instructions. Additionally or alternatively, the PWM and scan driver circuit 906 may be instantiated by any other combination of hardware, software, and/or firmware. For example, the PWM and scan driver circuit 906 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the matrix driver circuit 502 includes means for obtaining PWM signals. For example, the means for obtaining PWM signals may be implemented by the PWM active circuit 918. In some examples, the PWM active circuit 918 may be instantiated by processor circuitry such as the example processor circuitry 2012 of FIG. 20. For instance, the PWM active circuit 918 may be instantiated by the example general purpose processor circuitry 2100 of FIG. 21 executing machine executable instructions such as that implemented by at least block 1802 of FIG. 18. In some examples, the PWM active circuit 918 may be instantiated by hardware logic circuitry, which may be implemented by an ASIC or the FPGA circuitry 2200 of FIG. 22 structured to perform operations corresponding to the machine readable instructions. Additionally or alternatively, the PWM active circuit 918 may be instantiated by any other combination of hardware, software, and/or firmware. For example, the PWM active circuit 918 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the matrix driver circuit 502 includes means for obtaining scan signals. For example, the means for obtaining scan signals may be implemented by the scan shift register circuit 920. In some examples, the scan shift register circuit 920 may be instantiated by processor circuitry such as the example processor circuitry 2012 of FIG. 20. For instance, the scan shift register circuit 920 may be instantiated by the example general purpose processor circuitry 2100 of FIG. 21 executing machine executable instructions such as that implemented by at least block 1802 of FIG. 18. In some examples, the scan shift register circuit 920 may be instantiated by hardware logic circuitry, which may be implemented by an ASIC or the FPGA circuitry 2200 of FIG. 22 structured to perform operations corresponding to the machine readable instructions. Additionally or alternatively, the scan shift register circuit 920 may be instantiated by any other combination of hardware, software, and/or firmware. For example, the scan shift register circuit 920 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the matrix driver circuit 502 includes means for controlling micro-LEDs. For example, the means for controlling micro-LEDs may be implemented by the pixel matrix driver circuit 922. In some examples, the pixel matrix driver circuit 922 may be instantiated by processor circuitry such as the example processor circuitry 2012 of FIG. 20. For instance, the pixel matrix driver circuit 922 may be instantiated by the example general purpose processor circuitry 2100 of FIG. 21 executing machine executable instructions such as that implemented by at least blocks 1804, 1806, 1808, 1810, 1812, 1814, 1816, 1818 of FIG. 18. In some examples, the pixel matrix driver circuit 922 may be instantiated by hardware logic circuitry, which may be implemented by an ASIC or the FPGA circuitry 2200 of FIG. 22 structured to perform operations corresponding to the machine readable instructions. Additionally or alternatively, the pixel matrix driver circuit 922 may be instantiated by any other combination of hardware, software, and/or firmware. For example, the pixel matrix driver circuit 922 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the assist driver circuit 504 of FIGS. 5-8 is illustrated in FIG. 9, one or more of the elements, processes, and/or devices illustrated in FIG. 9 may be combined, divided, re-arranged, omitted, eliminated, and/or implemented in any other way. Further, the example PWM data driver circuit 902, the example current data driver circuit 904, the example PWM and scan driver circuit 906, and/or, more generally, the example assist driver circuit 504 of FIG. 9, may be implemented by hardware alone or by hardware in combination with software and/or firmware. Thus, for example, any of the example PWM data driver circuit 902, the example current data driver circuit 904, the example PWM and scan driver circuit 906, and/or, more generally, the example assist driver circuit 504, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example assist driver circuit 504 of FIGS. 5-8 may include one or more elements, processes, and/or devices in addition to, or instead of, those illustrated in FIG. 9, and/or may include more than one of any or all of the illustrated elements, processes and devices.

While an example manner of implementing the matrix driver circuit 502 of FIGS. 5-8 is illustrated in FIG. 9, one or more of the elements, processes, and/or devices illustrated in FIG. 9 may be combined, divided, re-arranged, omitted, eliminated, and/or implemented in any other way. Further, the example PWM active circuit 918, the example scan shift register circuit 920, the example pixel matrix driver circuit 922, and/or, more generally, the example matrix driver circuit 502 of FIG. 9, may be implemented by hardware alone or by hardware in combination with software and/or firmware. Thus, for example, any of the example PWM active circuit 918, the example scan shift register circuit 920, the example pixel matrix driver circuit 922, and/or, more generally, the example matrix driver circuit 502, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example matrix driver circuit 502 of FIGS. 5-8 may include one or more elements, processes, and/or devices in addition to, or instead of, those illustrated in FIG. 9, and/or may include more than one of any or all of the illustrated elements, processes and devices.

Figure 17:
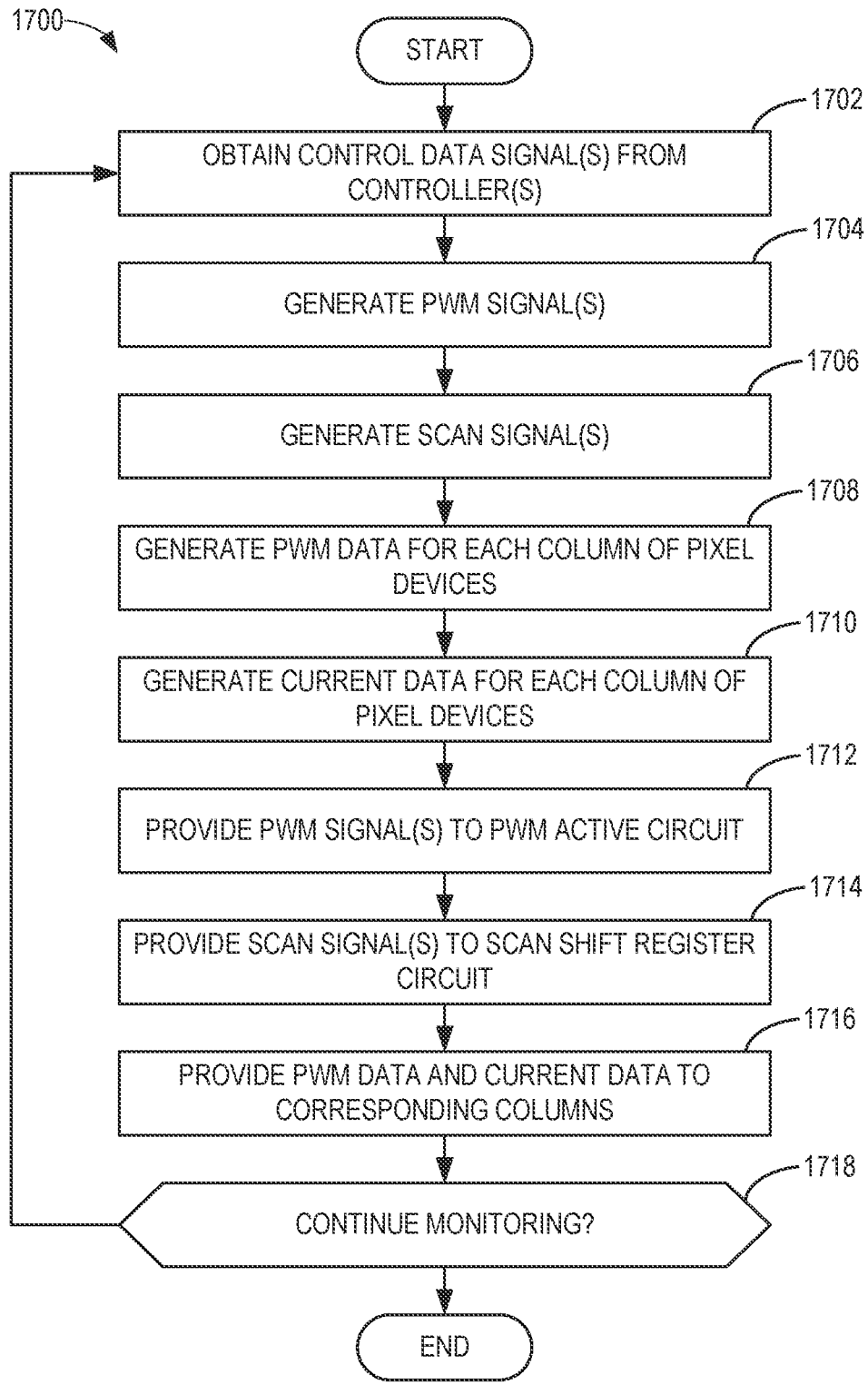
FIG. 17 is a flowchart representative of example machine readable instructions and/or example operations that may be executed and/or instantiated by the example assist driver circuit of FIG. 9 to generate and/or provide one or more signals for controlling the micro-LED display of FIGS. 4 and/or 5.

A flowchart representative of example hardware logic circuitry, machine readable instructions, hardware implemented state machines, and/or any combination thereof for implementing the assist driver circuit 504 of FIG. 9 is shown in FIG. 17. The machine readable instructions may be one or more executable programs or portion(s) of an executable program for execution by processor circuitry, such as the processor circuitry 1912 shown in the example processor platform 1900 discussed below in connection with FIG. 19 and/or the example processor circuitry discussed below in connection with FIGS. 21 and/or 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 17, many other methods of implementing the example assist driver circuit 504 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 18:
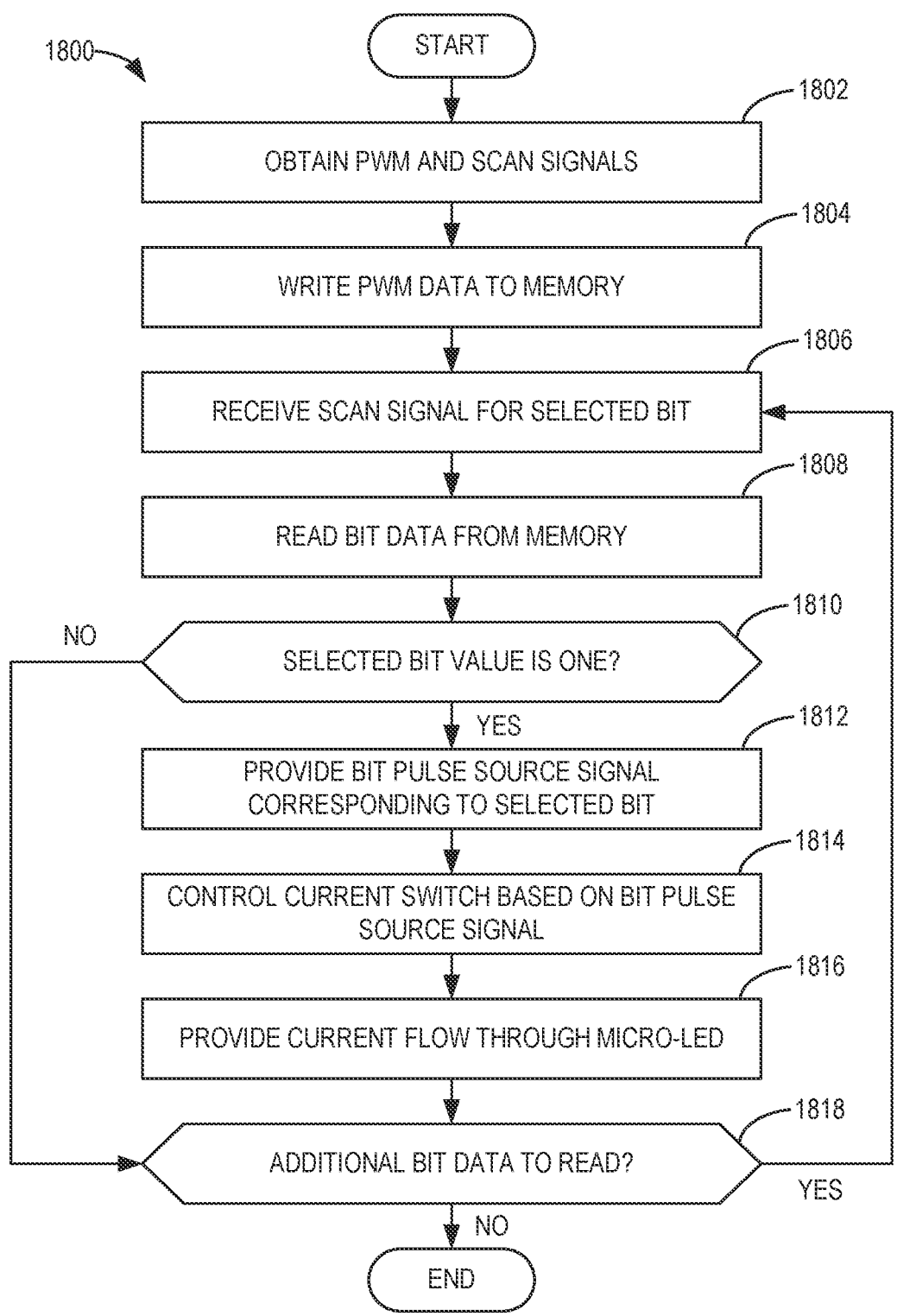
FIG. 18 is a flowchart representative of example machine readable instructions and/or example operations that may be executed and/or instantiated by the example matrix driver circuit of FIG. 9 to drive and/or otherwise control the example micro-LEDs of the micro-LED display of FIGS. 4 and/or 5.

A flowchart representative of example hardware logic circuitry, machine readable instructions, hardware implemented state machines, and/or any combination thereof for implementing the matrix driver circuit 502 of FIG. 9 is shown in FIG. 18. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 18, many other methods of implementing the example matrix driver circuit 502 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 17 and/or 18 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 17 is a flowchart representative of example machine readable instructions and/or example operations 1700 that may be executed and/or instantiated by the example assist driver circuit 504 of FIGS. 5-10 to generate and/or provide one or more signals for controlling the micro-LED display 400 of FIG. 4. The machine readable instructions and/or the operations 1700 of FIG. 17 begin at block 1702, at which the example assist driver circuit 504 obtains one or more of the example control signals 802 of FIG. 9 from the example controller(s) 608, 722. For example, the assist driver circuit 504 obtains the control signals 802 representing image data for one or more frames (e.g., images) to be displayed on the micro-LED display 400.

At block 1704, the example data driver generates the example PWM signal(s) 914 of FIG. 9. For example, the example PWM and scan driver circuit 906 of FIG. 9 generates the PWM signals 914 based on the control signals 802, where the PWM signals 914 can include PWM pulse signals for providing the bit pulse source signals 1209 of FIGS. 11 and/or 12. For example, the PWM signals 914 can include different signals for different bits of gray level bit data to be emitted by the micro-LED display 400, where the different signals correspond to different pulse widths.

At block 1706, the example assist driver circuit 504 generates the scan signal(s) 916 of FIG. 9. For example, the PWM and scan driver circuit 906 generates the scan signals 916 based on the control signals 802.

At block 1708, the example assist driver circuit 504 generates the example PWM data 910 for each column of the example pixel devices 404 of the micro-LED display 400. For example, the example PWM data driver circuit 902 of FIG. 9 generates the example PWM data 910 for each column based on the control signals 802. In some examples, the PWM data 910 includes gray level bit data representing one or more frames (e.g., images) to be displayed by the micro-LED display 400. In some examples, the PWM data 910 includes gray level bit data for each of the red, green, and blue micro-LEDs 403 of the corresponding pixel device 404.

At block 1710, the example assist driver circuit 504 generates the example current data 912 for each column of the pixel devices 404. For example, the example current data driver circuit 904 of FIG. 9 generates the current data 912 that indicates an amplitude of current to be supplied to the micro-LEDs 403 of the micro-LED display 400. In some examples, the amplitude is a fixed amplitude across each of the micro-LEDs 403.

At block 1712, the example assist driver circuit 504 provides the PWM signal(s) 914 to the example PWM active circuit 918 of the example matrix driver circuit 502 of FIG. 9. For example, the PWM and scan driver circuit 906 provides the PWM signal(s) 914 to the PWM active circuit 918 via first conductive paths in the example substrate 602 of FIGS. 6, 7A, and/or 7B.

At block 1714, the example assist driver circuit 504 provides the scan signal(s) 916 to the example scan shift register circuit 920 of the example matrix driver circuit 502 of FIG. 9. For example, the PWM and scan driver circuit 906 provides the scan signal(s) 916 to the scan shift register circuit 920 via second conductive paths in the example substrate 602.

At block 1716, the example assist driver circuit 504 provides the PWM data 910 and the current data 912 to the corresponding columns of the pixel devices 404. For example, the PWM data driver circuit 902 provides the PWM data 910 to the micro-LED driver(s) 1102 of the pixel devices 404, and the current data driver circuit 904 provides the current data 912 to the micro-LED driver(s) 1102.

At block 1718, the example assist driver circuit 504 determines whether to continue monitoring. For example, at least one of the PWM and scan driver circuit 906, the PWM data driver circuit 902, or the current data driver circuit 904 determines whether to continue monitoring in response to the controller(s) 608, 722 providing one or more additional control signals. In response to the assist driver circuit 504 determining to continue monitoring (e.g., block 1718 returns a result of YES), control returns to block 1702. Alternatively, in response to the assist driver circuit 504 determining not to continue monitoring (e.g., block 1718 returns a result of NO), control ends.

FIG. 18 is a flowchart representative of example machine readable instructions and/or example operations 1800 that may be executed and/or instantiated by the example matrix driver circuit 502 of FIGS. 5-11 to drive and/or otherwise control the example micro-LEDs 403 of the micro-LED display 400 of FIG. 4. In some examples, the machine readable instructions and/or the operations 1800 are executed for each row scan of the micro-LED display 400. The machine readable instructions and/or the operations 1800 of FIG. 18 begin at block 1802, at which the example matrix driver circuit 502 obtains the PWM signal(s) 914 and the scan signal(s) 916 from the example assist driver circuit 504 of FIGS. 5-10. For example, the example PWM data driver circuit 902 of FIGS. 9 and/or 10 obtains the PWM signal(s) 914 and the example current data driver circuit 904 of FIGS. 9 and/or 10 obtains the scan signal(s) 916 from the example PWM and scan driver circuit 906 of FIG. 9.

At block 1804, the example matrix driver circuit 502 write the example PWM data 910 to the example memory 1202 of the micro-LED driver circuits 1102 of FIGS. 11 and/or 12. For example, the micro-LED driver circuits 1102 write gray level bit data from the PWM data 910 to the memory 1202. In some examples, the gray level bit data includes binary data having N bits, where N is at least 10.

At block 1806, the example matrix driver circuit 502 receives one of the scan signals 916 corresponding to a selected bit. For example, current data driver circuit 904 provides the one of the scan signals 916 corresponding to a first bit of the gray level bit data to the micro-LED driver circuit 1102.

At block 1808, the example matrix driver circuit 502 reads bit data for the selected bit from the memory 1212. For example, to read a binary value stored in the memory 1212 for the selected bit, the micro-LED driver circuit 1102 closes one of the bit select switches 1210 corresponding to the selected bit. In some examples, the micro-LED driver circuit 1102 closes the one of the bit select switches 1210 that corresponds to the one of the scan signals 916.

At block 1810, the example matrix driver circuit 502 determines the selected bit value. For example, the binary value of the selected bit is provided to a corresponding one of the example bit select switches 1210 of FIGS. 12 and/or 13. In response to the bit select switch 1210 determining that the selected bit value of the selected bit is 0 (e.g., block 1810 returns a result of NO), control proceeds to block 1820. Alternatively, in response to the vit select switch 1210 determining that the selected bit value of the selected bit is 1 (e.g., block 1810 returns a result of YES), control proceeds to block 1812.

At block 1812, the example matrix driver circuit 502 provides one of the bit pulse source signals 1209 corresponding to the selected bit. For example, when the bit value of the selected bit is 1, the bit select switch 1210 opens a transistor switch corresponding to the one of the bit pulse source signals 1209. In such examples, the selected bit pulse source signal 1209 provides a reference pulse signal to the example current bit switch 1206 of FIGS. 12 and/or 13 to control operation thereof.

At block 1814, the example matrix driver circuit 502 controls the current bit switch 1206 based on the selected bit pulse source signal 1209. For example, when the reference pulse signal from the selected bit pulse source signal 1209 is active (e.g., has a non-zero value), the current bit switch 1206 is closed to enable flow of current therethrough between the voltage drain 1110 and the voltage source 1112 of FIGS. 10, 11, and/or 12. Conversely, when the reference pulse signal is inactive (e.g., has a value of zero), the current bit switch 1206 is turned off to prevent flow of current therethrough. In some examples, a duration for which the bit pulse source signal 1209 is active corresponds to a pulse width of the reference pulse signal.

At block 1816, the example matrix driver circuit 502 provides a flow of current through a corresponding one of the example micro-LEDs 403. For example, when the current bit switch 1206 is closed, the example current source generator 1208 generates a current to flow from the voltage drain 1110 to the voltage source 1112 via the micro-LED 403. In some examples, the current source generator 1208 selects an amplitude of the current based on the current data 912 provided thereto. In some examples, the flow of current through the micro-LED 403 causes emission of light therefrom, where a brightness of the micro-LED 403 corresponds to the amplitude of the current and/or the duration for which the current flows through the micro-LED 403.

At block 1818, the example matrix driver circuit 502 determines whether there is additional bit data to read. For example, the multiplexer 1204 determines whether there is a subsequent bit of the PWM data 910 to be read from the memory 1202. In response to the matrix driver circuit 502 determining that there is additional bit data to read (e.g., block 1818 returns a result of YES), control returns to block 1806. Alternatively, in response to the matrix driver circuit 502 determining there is no additional bit data to read (e.g., block 1818 returns a result of NO), control ends.

Figure 19:
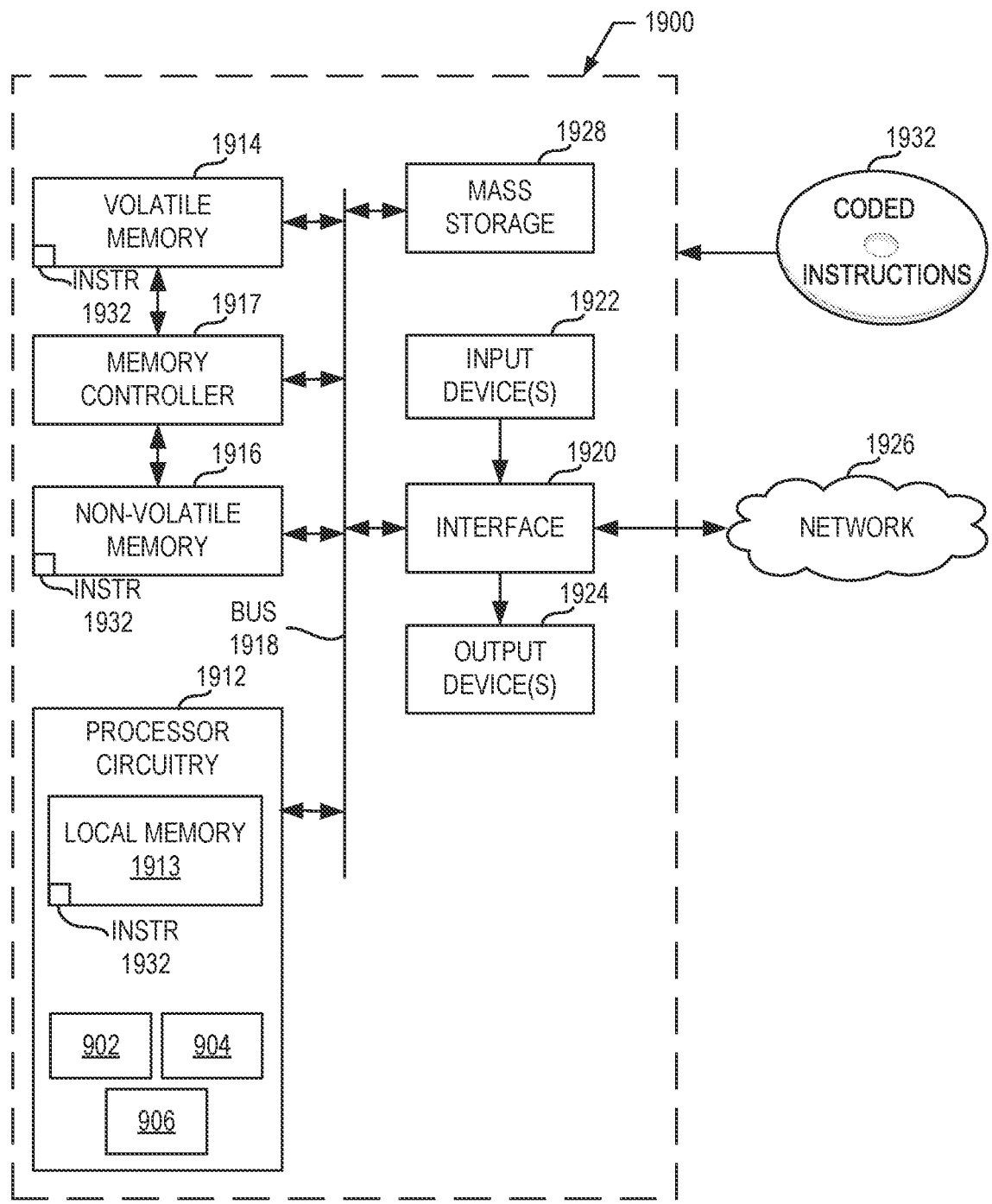
FIG. 19 is a block diagram of an example processing platform including processor circuitry structured to execute the example machine readable instructions and/or the example operations of FIG. 17 to implement the example assist driver circuit of FIG. 9.

FIG. 19 is a block diagram of an example processor platform 1900 structured to execute and/or instantiate the machine readable instructions and/or the operations of FIG. 17 to implement the assist driver circuit 504 of FIG. 9. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1900 of the illustrated example includes processor circuitry 1912. The processor circuitry 1912 of the illustrated example is hardware. For example, the processor circuitry 1912 can be implemented by one or more integrated circuits, logic circuits, FPGAs, microprocessors, CPUs, GPUs, DSPs, and/or microcontrollers from any desired family or manufacturer. The processor circuitry 1912 may be implemented by one or more semiconductor based (e.g., silicon based) devices. In this example, the processor circuitry 1912 implements the example PWM data driver circuit 902, the example current data driver circuit 904, and the example PWM and scan driver circuit 906.

The processor circuitry 1912 of the illustrated example includes a local memory 1913 (e.g., a cache, registers, etc.). The processor circuitry 1912 of the illustrated example is in communication with a main memory including a volatile memory 1914 and a non-volatile memory 1916 by a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1916 may be implemented by flash memory and/or any other desired type of memory device. Access to the main memory 1914, 1916 of the illustrated example is controlled by a memory controller 1917.

The processor platform 1900 of the illustrated example also includes interface circuitry 1920. The interface circuitry 1920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1922 are connected to the interface circuitry 1920. The input device(s) 1922 permit(s) a user to enter data and/or commands into the processor circuitry 1912. The input device(s) 1922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1924 are also connected to the interface circuitry 1920 of the illustrated example. The output device(s) 1924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1920 of the illustrated example, thus, typically includes a graphics driver card, a graphics driver chip, and/or graphics processor circuitry such as a GPU.

The interface circuitry 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1900 of the illustrated example also includes one or more mass storage devices 1928 to store software and/or data. Examples of such mass storage devices 1928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1932, which may be implemented by the machine readable instructions of FIG. 17, may be stored in the mass storage device 1928, in the volatile memory 1914, in the non-volatile memory 1916, and/or on a removable non-transitory computer readable storage medium such as a CD or DVD.

Figure 20:
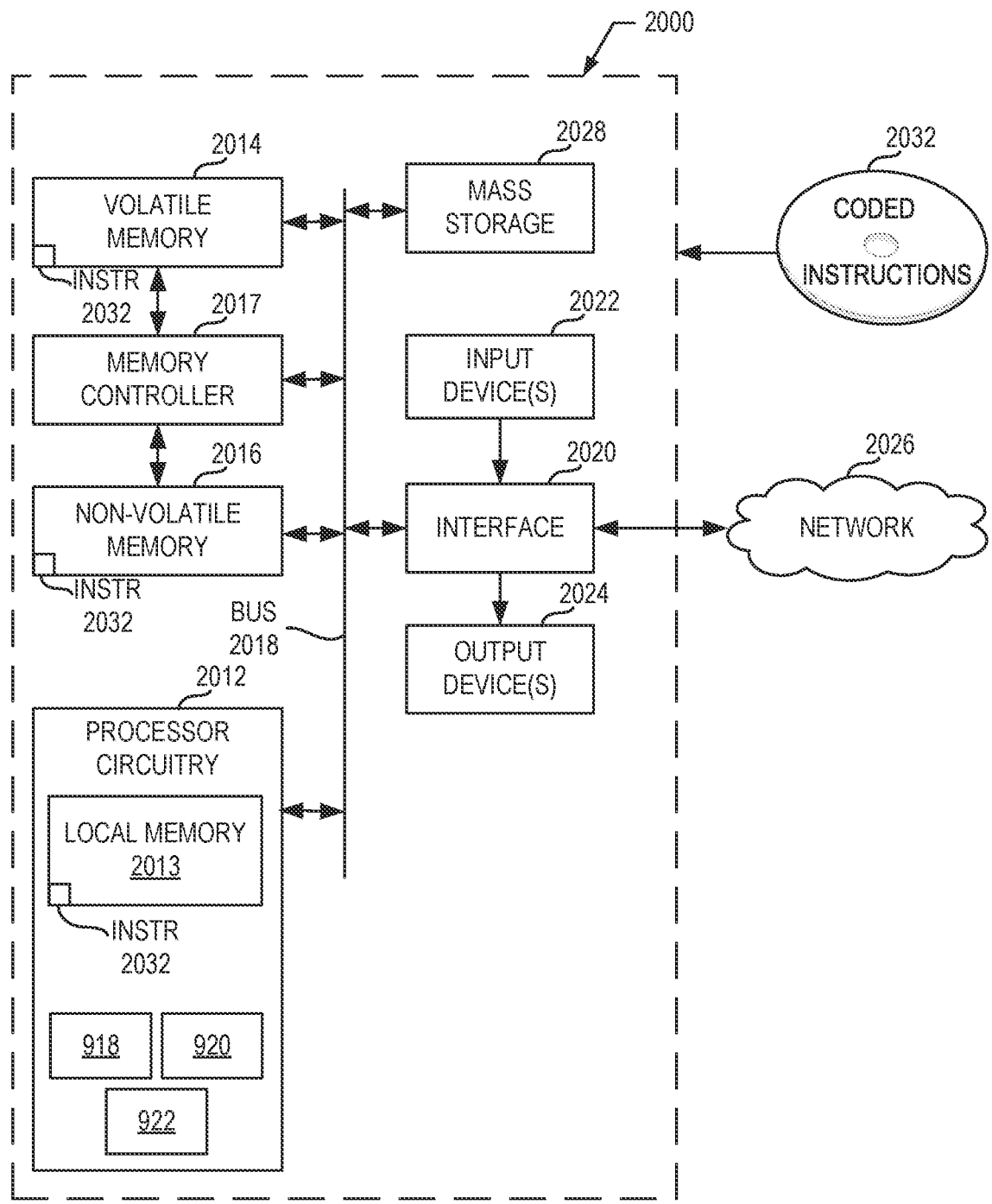
FIG. 20 is a block diagram of an example processing platform including processor circuitry structured to execute the example machine readable instructions and/or the example operations of FIG. 18 to implement the example matrix driver circuit of FIG. 9.

FIG. 20 is a block diagram of an example processor platform 2000 structured to execute and/or instantiate the machine readable instructions and/or the operations of FIG. 18 to implement the matrix driver circuit 502 of FIG. 9. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) devices. In this example, the processor circuitry 2012 implements the example PWM active circuit 918, the example scan shift register circuit 920, and the example pixel matrix driver circuit 922.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2022 are connected to the interface circuitry 2020. The input device(s) 2022 permit(s) a user to enter data and/or commands into the processor circuitry 2012. The input device(s) 2022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuitry 2020 of the illustrated example. The output device(s) 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 2032, which may be implemented by the machine readable instructions of FIG. 18, may be stored in the mass storage device 2028, in the volatile memory 2014, in the non-volatile memory 2016, and/or on a removable non-transitory computer readable storage medium such as a CD or DVD.

Figure 21:
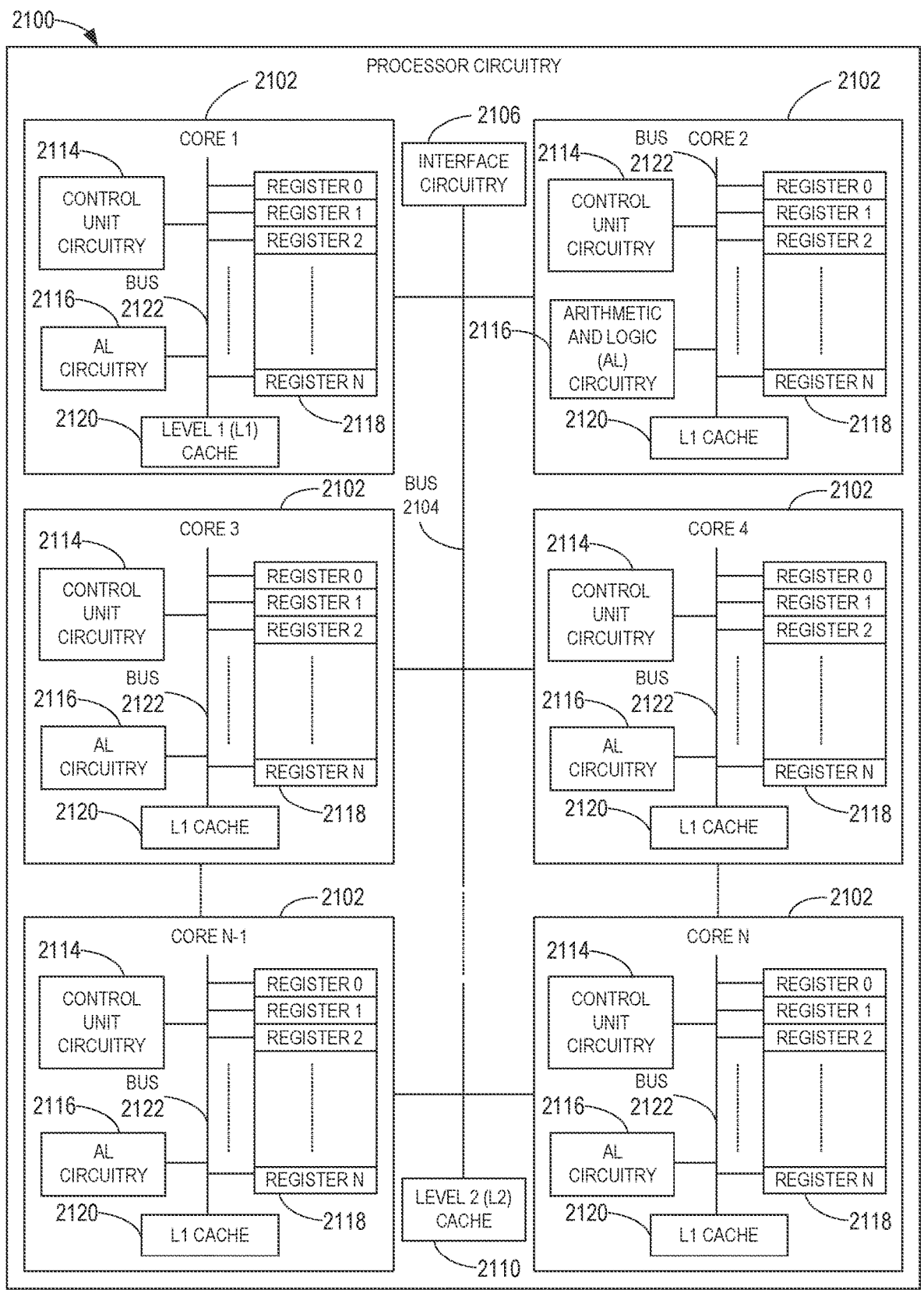
FIG. 21 is a block diagram of an example implementation of the processor circuitry of FIGS. 19 and/or 20.

FIG. 21 is a block diagram of an example implementation of the processor circuitry 1912 of FIG. 19 and/or the processor circuitry 2012 of FIG. 20. In this example, the processor circuitry 1912 of FIG. 19 and/or the processor circuitry 2012 of FIG. 20 is implemented by a general purpose microprocessor 2100. The general purpose microprocessor circuitry 2100 executes some or all of the machine readable instructions of the flowcharts of FIGS. 17 and/or 18 to effectively instantiate the circuitry of FIG. 9 as logic circuits to perform the operations corresponding to those machine readable instructions. In some such examples, the circuitry of FIG. 9 is instantiated by the hardware circuits of the microprocessor 2100 in combination with the instructions. For example, the microprocessor 2100 may implement multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowcharts of FIGS. 17 and/or 18.

The cores 2102 may communicate by a first example bus 2104. In some examples, the first bus 2104 may implement a communication bus to effectuate communication associated with one(s) of the cores 2102. For example, the first bus 2104 may implement at least one of an Inter-Integrated Circuit (I2C) bus, a Serial Peripheral Interface (SPI) bus, a PCI bus, or a PCIe bus. Additionally or alternatively, the first bus 2104 may implement any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2_cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 1914, 1916 of FIG. 19 and/or the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the L1 cache 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21.

Alternatively, the registers 2118 may be organized in any other arrangement, format, or structure including distributed throughout the core 2102 to shorten access time. The second bus 2122 may implement at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
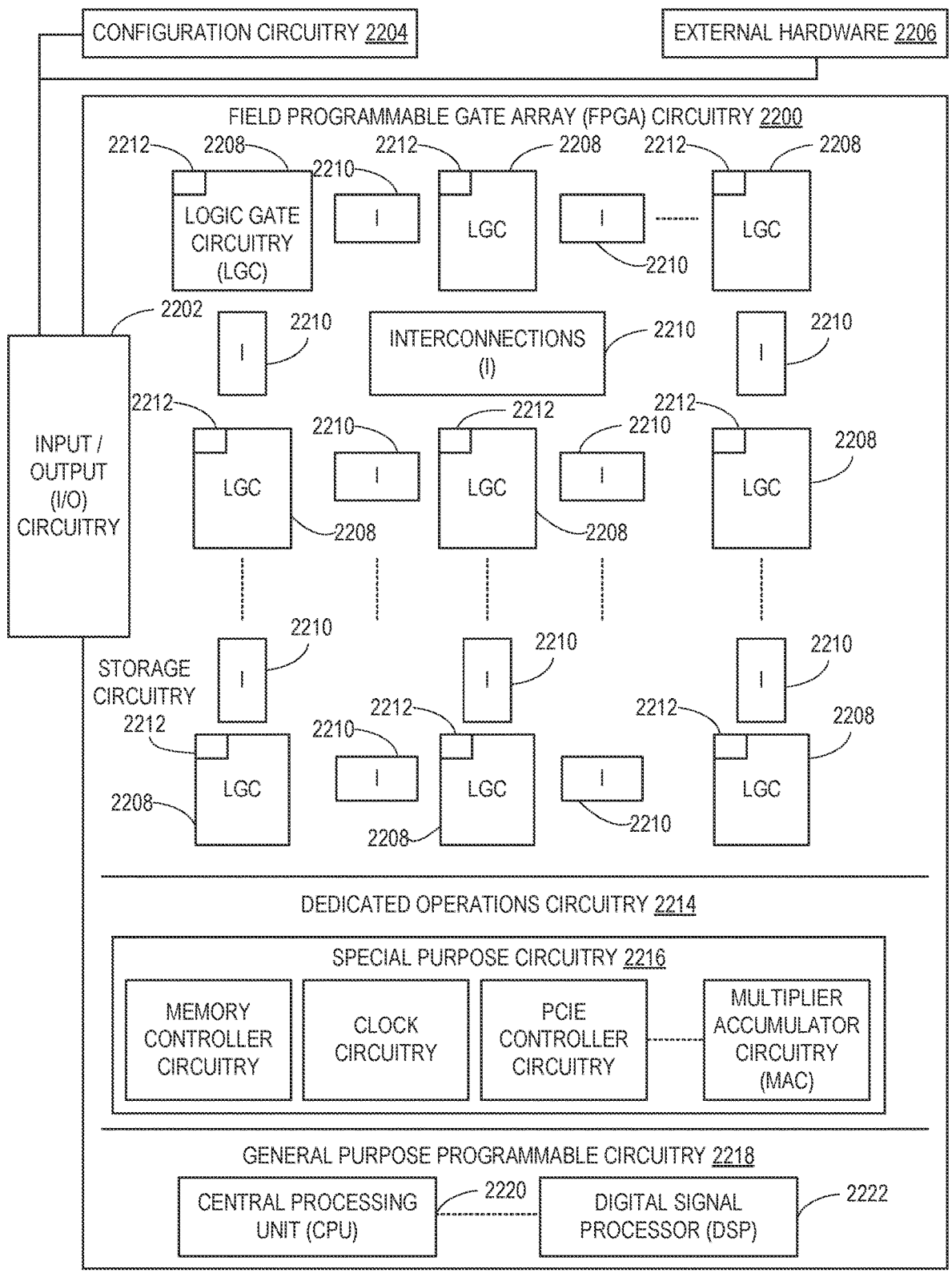
FIG. 22 is a block diagram of another example implementation of the processor circuitry of FIGS. 19 and/or 20.

FIG. 22 is a block diagram of another example implementation of the processor circuitry 1912 of FIG. 19 and/or the processor circuitry 2012 of FIG. 20. In this example, the processor circuitry 1912, 2012 is implemented by FPGA circuitry 2200. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowcharts of FIGS. 17 and/or 18 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowcharts of FIGS. 17 and/or 18. In particular, the FPGA 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowcharts of FIGS. 17 and/or 18. As such, the FPGA circuitry 2200 may be structured to effectively instantiate some or all of the machine readable instructions of the flowcharts of FIGS. 17 and/or 18 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIGS. 17 and/or 18 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware (e.g., external hardware circuitry) 2206. For example, the configuration circuitry 2204 may implement interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may implement the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and interconnections 2210 are configurable to instantiate one or more operations that may correspond to at least some of the machine readable instructions of FIGS. 17 and/or 18 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 1912 of FIG. 19 and/or the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 1912 of FIG. 19 and/or the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions represented by the flowcharts of FIGS. 17 and/or 18 may be executed by one or more of the cores 2102 of FIG. 21, a second portion of the machine readable instructions represented by the flowcharts of FIGS. 17 and/or 18 may be executed by the FPGA circuitry 2200 of FIG. 22, and/or a third portion of the machine readable instructions represented by the flowcharts of FIGS. 17 and/or 18 may be executed by an ASIC. It should be understood that some or all of the circuitry of FIG. 9 may, thus, be instantiated at the same or different times. Some or all of the circuitry may be instantiated, for example, in one or more threads executing concurrently and/or in series. Moreover, in some examples, some or all of the circuitry of FIG. 9 may be implemented within one or more virtual machines and/or containers executing on the microprocessor.

In some examples, the processor circuitry 1912 of FIG. 19 and/or the processor circuitry 2012 of FIG. 20 may be in one or more packages. For example, the processor circuitry 2100 of FIG. 21 and/or the FPGA circuitry 2200 of FIG. 22 may be in one or more packages. In some examples, an XPU may be implemented by the processor circuitry 1912 of FIG. 19 and/or the processor circuitry 2012 of FIG. 20, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that control a micro-LED display. Example systems, methods, apparatus, and articles of manufacture include matrix driver circuits to control multiple micro-LEDs of the micro-LED display, and a data driver circuit to provide PWM signals and scan signals to the matrix driver circuits. Disclosed systems, methods, apparatus, and articles of manufacture provide a micro-LED matrix of micro-LEDs on a first surface of a substrate, and one or more drivers to on a second surface of the substrate opposite the first surface. Advantageously, by removing the driver(s) from the first surface of the substrate, disclosed systems, methods, apparatus, and articles of manufacture enable a reduction in pixel pitch of the micro-LED display and, thus, improve a resolution of the micro-LED display. Furthermore, disclosed systems, methods, apparatus, and articles of manufacture reduce manufacturing and/or parts costs by reducing a number of the driver(s) to be implemented on the micro-LED display. Disclosed systems, methods, apparatus, and articles of manufacture improve the efficiency of using a computing device by reducing a number of drivers required to control the micro-LED display, thus reducing power consumption required. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to control a micro-LED display are disclosed herein. Further examples and combinations thereof include the following:

Example 1 includes an apparatus for a micro-light emitting diode (LED) display, the apparatus including a micro-LED matrix, a first driver circuit electrically coupled to micro-LEDs of the micro-LED matrix, and a second driver circuit electrically coupled to the first driver circuit, the second driver circuit to provide at least (a) a scan signal and (b) a pulse width modulation (PWM) signal to the first driver circuit, the first driver circuit to drive the micro-LEDs based on the scan signal and the PWM signal.

Example 2 includes the apparatus of example 1, wherein the first driver circuit includes pixel driver circuits coupled to corresponding ones of the micro-LEDs, the pixel driver circuits to receive gray level bit data and current data from the second driver circuit.

Example 3 includes the apparatus of example 2, further including a controller electrically coupled to the second driver circuit, the controller to provide a control signal to the second driver circuit, the current data and the gray level bit data based on the control signal, the control signal representative of an image to be displayed by the micro-LED display.

Example 4 includes the apparatus of example 2, wherein the second driver circuit includes a current data driver circuit to generate the current data, the current data to indicate a fixed amplitude of current to be provided to the micro-LEDs, and a PWM data driver circuit to generate the gray level bit data for each column of the pixel driver circuits.

Example 5 includes the apparatus of example 4, wherein the first driver circuit includes a scan shift register circuit to provide the scan signal to a selected row of the pixel driver circuits, and a PWM active circuit to receive the PWM signal from the second driver circuit, receive the scan signal from the scan shift register circuit, provide, based on the scan signal and the gray level bit data, the PWM signal to the selected row of the pixel driver circuits, and provide bit pulse source signals to the pixel driver circuits, the bit pulse source signals corresponding to different bits of the gray level bit data.

Example 6 includes the apparatus of example 5, wherein the pixel driver circuits include memory to store the gray level bit data, and a multiplexer to operate a first switch corresponding to a selected bit of the gray level bit data, and in response to the first switch being in an active state, operate a second switch based on a value of the selected bit.

Example 7 includes the apparatus of example 6, wherein the multiplexer is to, in response to the first switch and the second switch being in the active state, provide one of the bit pulse source signals corresponding to the selected bit to a current bit switch to cause the current bit switch to switch to the active state, the current bit switch in the active state to enable flow of current to a corresponding one of the micro-LEDs.

Example 8 includes the apparatus of example 7, further including a current source generator to generate the current based on the one of the bit pulse source signals and the current data.

Example 9 includes the apparatus of example 1, further including a substrate to carry the micro-LED matrix and the first driver circuit, the micro-LED matrix on a first surface of the substrate, the first driver circuit on a second surface of the substrate opposite the first surface.

Example 10 includes an apparatus for a micro-light emitting diode (LED) display, the apparatus comprising memory, instructions, and processor circuitry to execute the instructions to at least cause, based on a pulse width modulation (PWM) signal and a scan signal from a driver circuit, operation of first switches corresponding to different bits of gray level bit data, in response to the first switches being in an active state, cause operation of second switches based on values of the different bits of the gray level bit data, and in response to the second switches being in an active state, cause current to be provided micro-LEDs of a micro-LED array.

Example 11 includes the apparatus of example 10, wherein the processor circuitry is to provide bit pulse source signals to a third switch in response to the first and second switches being in the active state.

Example 12 includes the apparatus of example 11, wherein the processor circuitry is to switch the third switch to the active state based on the bit pulse source signals, the third switch in the active state to enable flow of the current to a corresponding one of the micro-LEDs.

Example 13 includes the apparatus of example 12, wherein the bit pulse source signals correspond to different pulse widths and to the different bits of the gray level bit data.

Example 14 includes the apparatus of example 10, wherein the processor circuitry is to obtain, from the driver circuit, the gray level bit data corresponding to different columns of the micro-LED array, the gray level bit data generated based on a control signal representative of an image to be displayed by the micro-LED display.

Example 15 includes the apparatus of example 10, wherein the processor circuitry is to cause the current to be provided based on current data obtained from the driver circuit, the current data to indicate a fixed amplitude of the current to be provided to the micro-LEDs.

Example 16 includes the apparatus of example 10, wherein the processor circuitry is to write the gray level bit data to the memory prior to operation of the first and second switches.

Example 17 includes the apparatus of example 10, wherein the processor circuitry is on a first surface of a substrate and the micro-LED array is on a second surface of the substrate, the second surface opposite the first surface.

Example 18 includes a non-transitory computer readable medium comprising instructions that, when executed, cause processor circuitry to at least cause, based on a pulse width modulation (PWM) signal and a scan signal from a driver circuit, operation of first switches corresponding to different bits of gray level bit data, in response to the first switches being in an active state, cause operation of second switches based on values of the different bits of the gray level bit data, and in response to the second switches being in the active state, cause current to be provided to micro-LEDs of a micro-LED array.

Example 19 includes the non-transitory computer readable medium of example 18, wherein the instructions, when executed, cause the processor circuitry to provide bit pulse source signals to a third switch in response to the second switches being in the active state.

Example 20 includes the non-transitory computer readable medium of example 19, wherein the instructions, when executed, cause the processor circuitry to switch the third switch to the active state based on the bit pulse source signals, the third switch in the active state to enable flow of the current to a corresponding one of the micro-LEDs.

Example 21 includes the non-transitory computer readable medium of example 20, wherein the bit pulse source signals correspond to different pulse widths and to the different bits of the gray level bit data.

Example 22 includes the non-transitory computer readable medium of example 18, wherein the instructions, when executed, cause the processor circuitry to obtain, from the driver circuit, the gray level bit data corresponding to different columns of the micro-LED array, the gray level bit data generated based on a control signal representative of an image to be displayed by a micro-LED display.

Example 23 includes the non-transitory computer readable medium of example 18, wherein the instructions, when executed, cause the processor circuitry to cause the current to be provided based on current data obtained from the driver circuit, the current data to indicate a fixed amplitude of the current to be provided to the micro-LEDs.

Example 24 includes the non-transitory computer readable medium of example 18, wherein the instructions, when executed, cause the processor circuitry to write the gray level bit data to memory prior to operation of the first and second switches.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for a micro-light emitting diode (LED) display, the apparatus including:
    a micro-LED matrix;
    pixel driver circuits electrically coupled to corresponding micro-LEDs of the micro-LED matrix, the pixel driver circuits to drive the micro-LEDs based on (a) a scan signal and (b) a pulse width modulation (PWM) signal;
    a current driver circuit to generate current data for the pixel driver circuits, the current data to indicate a fixed amplitude of current to be provided to the micro-LEDs; and
    a PWM data driver circuit to generate gray level bit data for respective columns of the pixel driver circuits.

2. The apparatus of claim 1, including a controller to provide a control signal to at least one of the current driver circuit or the PWM data driver circuit, the current data and the gray level bit data based on the control signal, the control signal representative of an image to be displayed by the micro-LED display.

3. The apparatus of claim 1, including:
    a scan shift register circuit to provide the scan signal to a selected row of the pixel driver circuits;
    a PWM and scan driver circuit to provide the scan signal to the scan shift register circuit; and
    a PWM active circuit to:
        receive the PWM signal from the PWM and scan driver circuit;
        receive the scan signal from the scan shift register circuit;
        provide, based on the scan signal and the gray level bit data, the PWM signal to the selected row of the pixel driver circuits; and
        provide bit pulse source signals to the pixel driver circuits, the bit pulse source signals corresponding to different bits of the gray level bit data.

4. The apparatus of claim 3, wherein the pixel driver circuits include:
    memory to store the gray level bit data; and
    a multiplexer to:
        operate a first switch corresponding to a selected bit of the gray level bit data; and
        in response to the first switch being in an active state, operate a second switch based on a value of the selected bit.

5. The apparatus of claim 4, wherein the multiplexer is to, in response to the first switch and the second switch being in the active state, provide one of the bit pulse source signals corresponding to the selected bit to a current bit switch to cause the current bit switch to switch to the active state, the current bit switch in the active state to enable flow of current to a corresponding one of the micro-LEDs.

6. The apparatus of claim 5, including a current source generator to generate the current based on the one of the bit pulse source signals and the current data.

7. The apparatus of claim 1, including a substrate to carry the micro-LED matrix and the pixel driver circuits, the micro-LED matrix on a first surface of the substrate, the pixel driver circuits on a second surface of the substrate opposite the first surface.

8. The apparatus of claim 1, including:
    a scan shift register circuit;
    a PWM active circuit; and
    a PWM and scan driver circuit to (a) provide the scan signal to the scan shift register circuit, and (b) provide the PWM signal to the PWM active circuit.

9. The apparatus of claim 8, wherein (a) the scan shift register circuit, (b) the PWM active circuit, and (c) the pixel driver circuits are associated with a first driver circuit, and wherein (a) the PWM and scan driver circuit, (b) the current driver circuit, and (c) the PWM data driver circuit are associated with a second driver circuit.

10. An apparatus for a micro-light emitting diode (LED) display, the apparatus comprising:
    memory;
    instructions; and
    processor circuitry to execute the instructions to at least:
        cause, based on a pulse width modulation (PWM) signal and a scan signal from a driver circuit, operation of first switches corresponding to different bits of gray level bit data;
        in response to the first switches being in an active state, cause operation of second switches based on values of the different bits of the gray level bit data; and
        in response to the second switches being in an active state, cause current to be provided to micro-LEDs of a micro-LED array.

11. The apparatus of claim 10, wherein the processor circuitry is to provide bit pulse source signals to a third switch in response to the first and second switches being in the active state.

12. The apparatus of claim 11, wherein the processor circuitry is to switch the third switch to the active state based on the bit pulse source signals, the third switch in the active state to enable flow of the current to a corresponding one of the micro-LEDs.

13. The apparatus of claim 12, wherein the bit pulse source signals correspond to different pulse widths and to the different bits of the gray level bit data.

14. The apparatus of claim 10, wherein the processor circuitry is to obtain, from the driver circuit, the gray level bit data corresponding to different columns of the micro-LED array, the gray level bit data generated based on a control signal representative of an image to be displayed by the micro-LED display.

15. The apparatus of claim 10, wherein the processor circuitry is to cause the current to be provided based on current data obtained from the driver circuit, the current data to indicate a fixed amplitude of the current to be provided to the micro-LEDs.

16. The apparatus of claim 10, wherein the processor circuitry is to write the gray level bit data to the memory prior to operation of the first and second switches.

17. The apparatus of claim 10, wherein the processor circuitry is on a first surface of a substrate and the micro-LED array is on a second surface of the substrate, the second surface opposite the first surface.

18. A non-transitory computer readable medium comprising instructions to cause processor circuitry to at least:
cause, based on a pulse width modulation (PWM) signal and a scan signal from a driver circuit, operation of first switches corresponding to different bits of gray level bit data;
in response to the first switches being in an active state, cause operation of second switches based on values of the different bits of the gray level bit data; and
in response to the second switches being in the active state, cause current to be provided to micro-LEDs of a micro-LED array.

19. The non-transitory computer readable medium of claim 18, wherein the instructions are to cause the processor circuitry to provide bit pulse source signals to a third switch in response to the second switches being in the active state.

20. The non-transitory computer readable medium of claim 19, wherein the instructions are to cause the processor circuitry to switch the third switch to the active state based on the bit pulse source signals, the third switch in the active state to enable flow of the current to a corresponding one of the micro-LEDs.

21. The non-transitory computer readable medium of claim 20, wherein the bit pulse source signals correspond to different pulse widths and to the different bits of the gray level bit data.

22. The non-transitory computer readable medium of claim 18, wherein the instructions are to cause the processor circuitry to obtain, from the driver circuit, the gray level bit data corresponding to different columns of the micro-LED array, the gray level bit data generated based on a control signal representative of an image to be displayed by a micro-LED display.

23. The non-transitory computer readable medium of claim 18, wherein the instructions are to cause the processor circuitry to cause the current to be provided based on current data obtained from the driver circuit, the current data to indicate a fixed amplitude of the current to be provided to the micro-LEDs.

24. The non-transitory computer readable medium of claim 18, wherein the instructions are to cause the processor circuitry to write the gray level bit data to memory prior to operation of the first and second switches.

* * * * *